US012625310B2

(12) United States Patent
Shin et al.

(10) Patent No.: US 12,625,310 B2
(45) Date of Patent: May 12, 2026

(54) OPTICAL FILTER

(71) Applicant: LMS CO., LTD., Pyeongtaek-si (KR)

(72) Inventors: Jung Yeol Shin, Pyeongtaek-si (KR);
Tae Jin Song, Pyeongtaek-si (KR);
Seong Yong Yoon, Pyeongtaek-si (KR);
Jin Hwan Kim, Pyeongtaek-si (KR)

(73) Assignee: LMS CO., LTD., Pyeongtaek-si (KR)

( * ) Notice: Subject to any disclaimer, the term of this
patent is extended or adjusted under 35
U.S.C. 154(b) by 474 days.

(21) Appl. No.: 18/327,315

(22) Filed: Jun. 1, 2023

(65) Prior Publication Data

US 2024/0077660 A1     Mar. 7, 2024

(30) Foreign Application Priority Data

Sep. 1, 2022     (KR) ........................ 10-2022-0110945

(51) Int. Cl.
G02B 5/26          (2006.01)
G02B 5/20          (2006.01)
(52) U.S. Cl.
CPC ............... G02B 5/26 (2013.01); G02B 5/207
(2013.01); G02B 5/208 (2013.01)

(58) Field of Classification Search
CPC ........... G02B 5/26; G02B 5/207; G02B 5/208
See application file for complete search history.

(56) References Cited

U.S. PATENT DOCUMENTS

| | | | |
|---|---|---|---|
| 9,588,269 B2 | 3/2017 | Hendrix et al. | |
| 2016/0266289 A1* | 9/2016 | Hendrix | ................. G02B 5/281 |
| 2021/0055462 A1 | 2/2021 | Kweon et al. | |
| 2021/0231847 A1* | 7/2021 | Xiao | ........................ C03C 3/087 |

FOREIGN PATENT DOCUMENTS

| | | |
|---|---|---|
| KR | 10-2015-0031336 A | 3/2015 |
| KR | 10-2021-0023565 A | 3/2021 |
| KR | 10-2021-0072759 A | 6/2021 |

* cited by examiner

*Primary Examiner* — Travis M Figg
(74) *Attorney, Agent, or Firm* — NKL LAW; Jae Youn
Kim

(57) ABSTRACT

The present invention provides an optical filter having a
narrow bandpass, high transmittance in the bandpass, low
transmittance outside the bandpass, little change in optical
properties even when the incident angle of light changes and
thus, being advantageous in terms of yield and cost per hour.
In addition, the present invention may provide a LiDAR
system including the optical filter and an application of the
optical filter and the LiDAR system.

20 Claims, 7 Drawing Sheets

OPTICAL FILTER

FIELD

The present invention relates to an optical filter, a LiDAR (Light Detection and Ranging) system including the optical filter, and its application.

BACKGROUND

A LiDAR (Light Detection and Ranging) system is a system that can detect the distance, direction, speed, temperature, material distribution and concentration characteristics of an object by shining a laser on the target. To detect the laser reflected from the target, an optical filter is utilized.

The optical filter is specifically a band pass filter, and it transmits the laser reflected from the target to a recognition sensor (e.g., an image sensor, etc.), simultaneously blocks ambient light substantially, and thus, it is possible to increase the recognition sensitivity of the reflected laser. In other words, the optical filter serves to transmit the laser reflected from the target but substantially to block ambient light.

Therefore, since the optical filter must transmit only the laser reflected from the target as much as possible, it must have a bandpass including at least a part of the wavelength region of the laser. Also, the bandpass must have a high level of transmittance in the wavelength region while the bandpass is narrow and thus, it should exhibit a high level of transmission barrier outside the bandpass.

For the optical filter, it is common to form a dielectric layer by alternatively stacking a high refractive indexed layer and a low refractive indexed layer on both surfaces of a substrate where $TiO_2$ is used as the high refractive indexed layer, and $SiO_2$ is used as the low refractive indexed layer. In this case, to form a narrow and high transmittance bandpass and to exhibit the transmission barrier outside the bandpass, a rather large number of stacked layers should have been formed. Such a conventional optical filter with a bandpass filter is disclosed in a prior art: U.S. Pat. No. 9,588,269.

However, in a case of an optical filter having a large number of layers, it generally has high transmittance within the bandpass and low transmittance outside the bandpass, but the overall thickness of the optical filter becomes thick, and thus, there is a problem of bending due to thermal expansion. In addition, if the number of layers is large, it is disadvantageous in terms of yield per hour or cost.

In addition, for the optical filter having a large number of layers as described above, the central wavelength of the bandpass is greatly changed with respect to the change in the incident angle of the reflected laser. This is the so-called shift phenomenon, which increases the amount of ambient light transmitted by the shift; decreases the signal-to-noise ratio (SNR); and reduces the amount of light transmitted over the required angle of incidence. To transmit the reflected laser, the bandpass shall be relatively widened, so there is a problem in that the detection sensitivity is relatively low.

Accordingly, it is necessary to secure an optical filter that has a narrow bandpass, high transmittance in the bandpass, low transmittance outside the bandpass, and reduces the overall number of layers, thereby improving the above-described problem.

SUMMARY

An object of the present invention is to provide an optical filter having a narrow bandpass, high transmittance in the bandpass, and low transmittance outside the bandpass.

Another object of the present invention is to provide an optical filter that has little change in optical properties even when the incident angle of light is changed, and is advantageous in terms of yield per hour and cost.

Furthermore, another object of the present invention is to provide a LiDAR system including the optical filter and the application of the optical filter and LiDAR system.

According to an embodiment of the invention, there is provided that an optical filter comprises a reflective layer including a plurality of a first layer and a plurality of a second layer are formed in the reflective layer, respectively. The first layer is an amorphous silicon layer and the second layer has a lower refractive index than a refractive index of the amorphous silicon layer. The optical filter shows a transmission band having a bandwidth within a range of 20 nm to 150 nm within a wavelength range of 700 nm to 2,000 nm and has an average transmittance of 5% or less in a wavelength band other than the wavelength forming the transmission band within a wavelength range of 700 nm to 2,000 nm.

In an embodiment, a central wavelength of the transmission band is in a range of 800 nm to 1,650 nm for the optical filter layer in the present invention.

In an embodiment, a highest transmittance within the transmittance band is 90% or more for the optical filter layer in the present invention.

In an embodiment, an average transmittance within the transmittance band is 70% or more for the optical filter layer in the present invention.

In an embodiment, an absolute value of $L_1$ in the following Equation 1 is 0.6 or less, and an absolute value of $L_2$ in the following Equation 2 is 0.6 or less:

$$L_1 = 0.01 \times (\lambda_1 - \lambda_2); \text{ and} \qquad \text{[Equation 1]}$$

[Equation 2]

$L_2 = 0.01 \times (\lambda_3 - \lambda_4)$ where in Equation 1, $\lambda_1$ is the shortest wavelength of the optical filter exhibiting a transmittance of 10% in a wavelength region of 700 nm to 2,000 nm, and $\lambda_2$ is the shortest wavelength of the optical filter exhibiting a transmittance of 80% in the wavelength region of 700 nm to 2,000 nm and where in Equation 2, $\lambda_3$ is the longest wavelength of the optical filter exhibiting a transmittance of 10% in the wavelength region of 700 nm to 2,000 nm, and $\lambda_4$ is a longest wavelength of the optical filter exhibiting a transmittance of 80% in the wavelength region of 700 nm to 2,000 nm for the optical filter layer in the present invention.

In an embodiment, an absolute value of $\Delta\lambda_{ON}$ in the following Equation 3 is 5% or less:

[Equation 3]

$\Delta\lambda_{ON} = 100 \times (\lambda_{ON.\ 30} - \lambda_{ON.\ 0})/\lambda_{ON.\ 0}$ where in Equation 3, $\lambda_{ON.\ 0}$ is the shortest wavelength of the optical filter exhibiting a transmittance of 50% in a wavelength region of 700 nm to 2,000 nm and an incident angle of 0°, and $\lambda_{ON.\ 30}$ is the shortest wavelength of the optical filter exhibiting a transmittance of 50% in the wavelength region of 700 nm to 2,000 nm and an incident angle of 30° for the optical filter layer in the present invention.

In an embodiment, an absolute value of $\Delta\lambda_{OFF}$ of the following Equation 4 is 5% or less:

[Equation 4]

$\Delta\lambda_{OFF} = 100 \times (\lambda_{OFF.\ 30} - \lambda_{OFF.\ 0})/\lambda_{OFF.\ 0}$ where in Equation 4, $\lambda_{OFF.\ 0}$ is the longest wavelength of the optical filter exhibiting a transmittance of 50% in a wavelength region of 700 nm to 2,000 nm and an incident angle of 0°, and $\lambda_{OFF.\ 30}$ is the longest wavelength of the optical filter exhibiting a transmittance of 50% in the wavelength region of 700 nm to 2,000 nm and an incident angle of 30° for the optical filter layer in the present invention.

In an embodiment, the absolute value of $\Delta\lambda_C$ of the following Equation 5 is 5% or less:

[Equation 5]

$\Delta\lambda_C = 100 \times (\lambda_{C.\ 30} - _{C.\ 0})/\lambda_{C.\ 0}$ where in Equation 5, $\lambda_{C.\ 0}$ is a central wavelength of the transmission band of the optical filter at an incident angle of 0°, and $\lambda_{C.\ 30}$ is a central wavelength of the transmission band of the optical filter at an incidence angle of 30° for the optical filter layer in the present invention.

In an embodiment, an absolute value of $\Delta B$ in the following Equation 6 is 30% or less:

[Equation 6]

$\Delta B = 100 \times (B_{30} - B_0)/B_0$ where in Equation 6, $B_0$ is a bandwidth of the transmission band of the optical filter at an incident angle of 0° and $B_{30}$ is a bandwidth of the transmission band of the optical filter at an incidence angle of 30° for the optical filter layer in the present invention.

In an embodiment, the absolute value of $\Delta L_1$ in the following Equation 7 is 3 or less, and an absolute value of $\Delta L_2$ in the following Equation 8 is 3 or less:

$$\Delta L_1 = (L_{1.30} - L_{1.0})/L_{1.0};\ \text{and} \qquad \text{[Equation 7]}$$

[Equation 8]

$\Delta L_2 = (L_{2.30} - L_{2.0})/L_{2.0}$ where in Equation 7, $L_{1.30}$ is a value of $L_1$ of Equation 1 obtained at an incident angle of 30°, $L_{1.0}$ is a value of $L_1$ of Equation 1 obtained at an incident angle of 0° and $L_{2.30}$ in Equation 8 is a value of $L_2$ of Equation 2 obtained at an incident angle of 30°, $L_{2.0}$ is a value of $L_2$ of Equation 2 obtained at an incident angle of 0°:

$$L_1 = 0.01 \times (\lambda_1 - \lambda_2);\ \text{and} \qquad \text{[Equation 1]}$$

[Equation 2]

$L_2 = 0.01 \times (\lambda_3 - \lambda_4)$ where in Equation 1, $\lambda_1$ is the shortest wavelength of the optical filter exhibiting a transmittance of 10% in a wavelength region of 700 nm to 2,000 nm, and $\lambda_2$ is the shortest wavelength of the optical filter exhibiting a transmittance of 80% in the wavelength region of 700 nm to 2,000 nm; and in Equation 2, $\lambda_3$ is the longest wavelength of the optical filter exhibiting a transmittance of 10% in the wavelength region of 700 nm to 2,000 nm, and $\lambda_4$ is the longest wavelength of the optical filter exhibiting a transmittance of 80% in the wavelength region of 700 nm to 2,000 nm for the optical filter layer in the present invention.

In an embodiment, the first layer has a refractive index of 3.3 or more at a wavelength of 940 nm and a refractive index of 3.1 or more at a wavelength of 1550 nm for the optical filter layer in the present invention.

In an embodiment, the first layer has an extinction coefficient K of zero at any one of a thickness within a thickness range of 60 nm to 300 nm and a wavelength within a wavelength range of 800 nm to 900 nm for the optical filter layer in the present invention.

In an embodiment, a ratio $n_1/n_2$ of the refractive index $n_1$ of the first layer and a refractive index $n_2$ of the second layer is 1.3 or more for the optical filter layer in the present invention.

In an embodiment, the first layer and the second layer are alternately stacked on each other in the reflective layer, and the reflective layer further includes a third layer, and a ratio $n_1/n_3$ of the refractive index $n_1$ of the first layer and a refractive index $n_3$ of the third layer is 1.3 or more for the optical filter layer in the present invention.

In an embodiment, the reflective layer has a thickness in a range of 2 μm to 10 μm for the optical filter layer in the present invention.

In an embodiment, R in the following Equation 9 is in a range of 14 to 20:

[Equation 9]

$R = 4 \times T/\lambda_C$ where in Equation 9, T is a thickness of the reflective layer having a unit in mm and $\lambda_C$ is a central wavelength of the transmission band of the optical filter for the optical filter layer in the present invention.

In an embodiment, the first layer and the second layer in the reflective layer each independently have a thickness of 5 nm to 1,000 nm for the optical filter layer in the present invention.

In an embodiment, an average thickness of the first and second layers in the reflective layer is each independently within a range of 80 nm to 400 nm for the optical filter layer in the present invention.

In an embodiment, $R_H$ of the following Equation 10 is 30% or more:

[Equation 10]

$R_H = 100 \times T_H/(T_H + T_L)$ where in Equation 10, $T_H$ is a total thickness of the first layer in the reflective layer, and $T_L$ is a total thickness of the second layer in the reflective layer for the optical filter layer in the present invention.

In an embodiment, $R_{HO}$ of the following Equation 11 is in a range of 55 to 80:

[Equation 11]

$R_{HO} = T_{HO}/(T_{HO} + T_{LO})$ where $T_{HO}$ is an optical thickness of the first layer in the reflective layer, $T_{LO}$ is an optical thickness of the second layer in the reflective layer, and the optical thickness of the first layer is a product of a total thickness of the first layer in the reflective layer and the refractive index of the first layer, and the optical thickness of the second layer is a product of a total thickness of the second layer in the reflective layer and the refractive index of the second layer for the optical filter layer in the present invention.

In an embodiment, a total number of the first and the second layers in the reflective layer is in a range of 20 to 150 layers, and a ratio $(L_{1+2}/L_T)$ between the total number of layers of the first and second layers $(L_{1+2})$ in the reflective layer and a number of layers of entire sub-layers $(L_T)$ is in a range of 0.85 to 1 for the optical filter layer in the present invention.

In an embodiment, wherein a ratio $(T_1/T_2)$ between a total number of layers of the first layer $(T_1)$ and a total number of layers of the second layer $(T_2)$ in the reflective layer is in a range of 0.5 to 1.5 for the optical filter layer in the present invention.

According to another embodiment of the invention, there is provided that a LiDAR system comprises any one of the optical filters as stated above.

DETAILED DESCRIPTION

Figure 1:
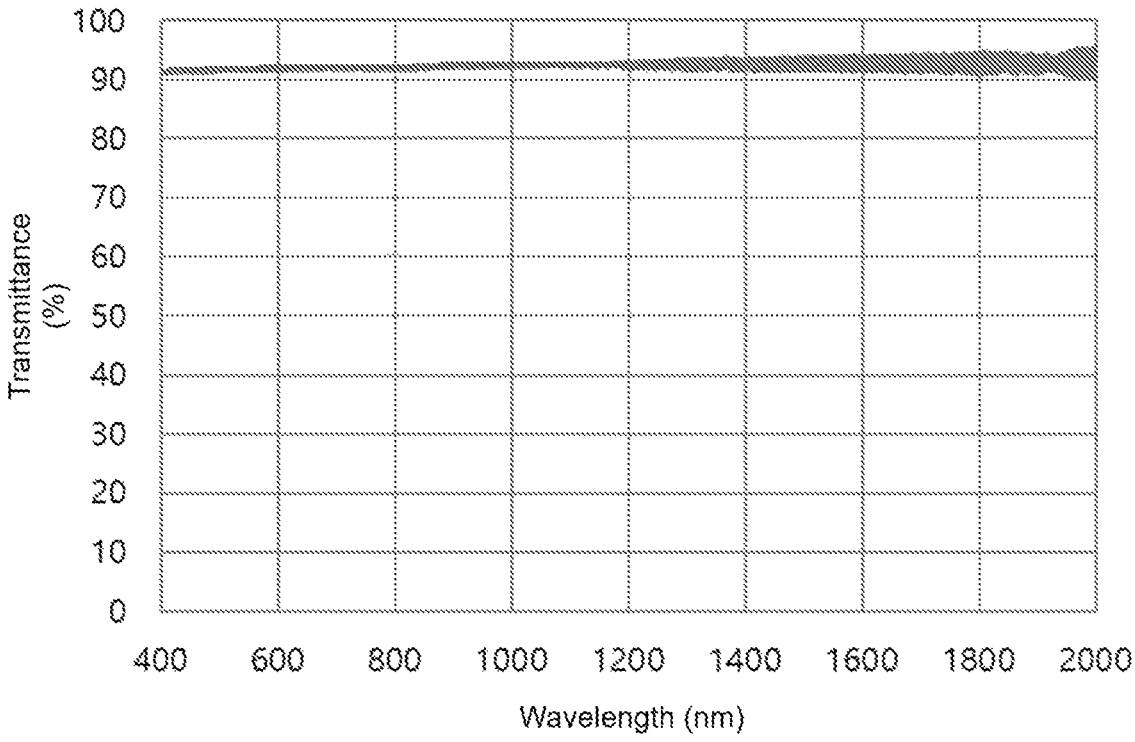
FIG. 1 shows transmittance spectra of glass substrates used in Embodiments and Comparative Examples.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

For those physical properties mentioned in the present invention where the result of measuring temperature and/or pressure may affect, it is measured at room temperature and/or atmosphere pressure unless otherwise specified. The term "room temperature" used in the present invention refers to a natural temperature that is not heated or not reduced, for example, it means any temperature within the range of 10° C. to 30° C., a temperature of about 23° C. or about 25° C. In addition, in the present specification, the unit of temperature is Celsius (° C.) unless otherwise specified.

The term "atmospheric pressure" is a natural pressure that is not pressurized or depressurized. It usually means about 1 atmosphere of atmospheric pressure having the value of about 740 mmHg to 780 mmHg. In the case of a physical property in which the measured humidity affects the result, the physical property is a physical property measured at natural humidity that is not specifically controlled at the room temperature and/or atmosphere pressure.

The term "transmittance" used in the present invention means an actual transmittance (measured transmittance) confirmed at a specific wavelength unless otherwise specified. In addition, the term "reflectance" used in the present invention means an actual reflectance (measured reflectance) confirmed at a specific wavelength unless otherwise specified.

The term "transmittance" used in the present invention is a value measured using an ultraviolet and visible spectrophotometer and means the transmittance for light at an incident angle of 0° based on the normal of the measurement target surface unless the incident angle is specifically specified. In addition, the term "reflectance" used in this invention is a value measured using an ultraviolet and visible spectrophotometer, and unless the incident angle is specifically specified, it means the reflectance for light at an incident angle of 0° based on the normal of the measurement target surface.

In the present invention, the term "average transmittance" or "average reflectance" is a result of obtaining an arithmetic average of the measured transmittances or reflectances after measuring transmittance or reflectance of each wavelength while increasing the wavelength by 1 nm from the shortest wavelength within a predetermined wavelength region unless otherwise specified. Also, in the present specification, the term "maximum transmittance" or "maximum reflectance" refers to the maximum transmittance or the maximum reflectance when the transmittance or the reflectance of each wavelength is measured while increasing the wavelength by 1 nm from the shortest wavelength within a predetermined wavelength region. Furthermore, in the present specification, the term "minimum transmittance" or "minimum reflectance" refers to the minimum transmittance or the minimum reflectance when the transmittance or the reflectance of each wavelength is measured while increasing the wavelength by 1 nm from the shortest wavelength within a predetermined wavelength region.

For example, the average transmittance or the average reflectance within the wavelength range of 350 nm to 360 nm is an arithmetic average of transmittance or reflectance measured at the wavelength of 350 nm, 351 nm, 352 nm, 353 nm, 354 nm, 355 nm, 356 nm, 357 nm, 358 nm, 359 nm and 360 nm. The maximum transmittance or the maximum reflectance within the wavelength range of 350 nm to 360 nm is the highest transmittance or reflectance among transmittances or reflectances measured at the wavelength of 350 nm, 351 nm, 352 nm, 353 nm, 354 nm, 355 nm, 356 nm, 357 nm, 358 nm, 359 nm and 360 nm. The minimum transmittance or the minimum reflectance within the wavelength range of 350 nm to 360 nm is the lowest transmittance or reflectance among transmittances or reflectances measured at the wavelength of 350 nm, 351 nm, 352 nm, 353 nm, 354 nm, 355 nm, 356 nm, 357 nm, 358 nm, 359 nm and 360 nm.

The term "incident angle" used in the present invention is an angle normal to a surface to be evaluated. For example, a transmittance at an incident angle of 0° for the optical filter means the transmittance for light incident in a direction parallel to the normal of the optical filter surface. Also, a transmittance at an incident angle of 40° is the transmittance for the incident light forming an angle of 40° in the clockwise or the counterclockwise direction with respect to the normal of the optical filter surface. This definition of the incident angle is equally applied to other characteristics such as transmittance.

In the case where an optical characteristic (e.g., refractive index) referred to in the present invention is a characteristic that varies depending on the wavelength, the optical characteristic is a result obtained for light having a wavelength of 520 nm unless otherwise specified. The term "refractive index" used in the present invention may be measured in a wavelength range of 400 to 1,200 nm at 25° C., and may mean a refractive index obtained for light having a wavelength of 520 nm unless otherwise specified.

The term "amorphous silicon" used in the present invention may mean that the silicon's crystal structure is substantially amorphous. Here, the substantially amorphous means that the arrangement of silicon atoms exists in a completely disordered state as well as in an ordered state in some regions, so that the measured Raman peak shows at about 500 cm$^{-1}$ or less, 499 cm$^{-1}$ or less, 498 cm$^{-1}$ or less, 497 cm$^{-1}$ or less, 496 cm$^{-1}$ or less, or 495 cm$^{-1}$ or less. The Raman peak means a value measured according to the following physical property measurement method. The upper limit of the Raman peak is not particularly limited, but may be, for example, 480 cm$^{-1}$ or more, 482 cm$^{-1}$ or more, or 483 cm$^{-1}$ or more.

The term "transmission band (or bandpass)" used in the present invention means a region (i.e., band) continuously showing transmittance of 50% or more regardless of the incident angle of incident light in a wavelength region of 700 nm to 2,000 nm. The transmittance may be a value measured according to the following physical property measurement method. In addition, the shortest wavelength showing 50% transmittance in the transmission band is called a cut-on wavelength, and the longest wavelength showing 50% transmittance is called a so-called cut-off wavelength.

The term "bandwidth" used in the present invention means a difference between the cut-on wavelength and the cut-off wavelength. In other words, it is a value obtained by subtracting the cut-on wavelength from the cut-off wavelength.

The term "central wavelength" used in the present invention means a wavelength corresponding to the median value of the cut-on wavelength and the cut-off wavelength. In other words, a value divided by 2 after adding the cut-on wavelength and the cut-off wavelength becomes the central wavelength. The central wavelength may refer to the central wavelength of the transmission band.

The term "reflective layer" used in the present invention refers to a layer having a reflection band, and the reflection band of the reflective layer means a wavelength region of 300 nm to 3 μm or at least 300 nm to 1,500 nm where the reflectivity continuously shows 80% or more, 85% or more, or 90% or more in at least some regions excluding the aforementioned transmission band region regardless of the incident angle of the incident light. "Continuous in the reflection band" may mean that the transmission band is at least 10 nm or more, 20 nm or more, 30 nm or more, 40 nm or more, or 50 nm or more. In addition, because of the reflective layer, an optical filter according to an embodiment of the present invention may maintain low average transmittance in a wavelength band other than a wavelength forming a transmission band.

The term "visible light" (or visible light) used in the present invention refers to light having a wavelength range of approximately 380 to 720 nm. In addition, the term "ultraviolet light" (or ultraviolet light) used in the present invention means light having a wavelength range of 10 nm or more and less than 380 nm. In addition, the term "infrared" (or infrared light) used in the present invention means light having a wavelength region of more than 720 nm and 1 mm, and the term "near-infrared" (or near-infrared light) means light having a wavelength region of more than 720 nm and 3 μm.

An optical filter according to an embodiment of the present invention may include a reflective layer. In addition, the optical filter according to an embodiment of the present invention may include a substrate, and the reflective layer may be formed on at least one surface of the substrate.

The optical filter according to an embodiment of the present invention may satisfy at least one or more of the following optical properties, and these optical properties may be achieved by a combination of a reflective layer and a substrate; material of a first layer and a second layer in the reflective layer; and a combination therebetween.

The optical filter according to an embodiment of the present invention may exhibit a transmission band having a bandwidth within a range of 20 nm to 150 nm, 30 nm to 120 nm, or 40 nm to 100 nm in a wavelength range of 700 nm to 2,000 nm. In addition, the optical filter according to an embodiment of the present invention may have an average transmittance of 5% or less, 4.5% or less, 4% or less, 3.5% or less, 3% or less, 2.5% or less, 2% or less, 1.5% or less, or 1% or less in a wavelength band other than a wavelength forming the transmission band within a wavelength range of 700 nm to 2,000 nm, and the lower limit of the average transmittance is not particularly limited, but it may be 0% or more, 0.001% or more, or 0.01% or more. In addition, the optical filter according to an embodiment of the present invention may have an average transmittance within a wavelength range of 400 nm to 700 nm of 5% or less, 4.5% or less, 4% or less, 3.5% or less, 3% or less, 2.5% or less, 2% or less, 1.5% or less, or 1% or less, and the lower limit of the average transmittance is not particularly limited, but it may be 0% or more, 0.001% or more, or 0.01% or more.

Since the optical filter has a low average transmittance other than the transmittance band the bandwidth, the laser reflected from the target can be effectively transmitted to the recognition sensor, and at the same time, the signal-to-noise ratio can be increased by substantially blocking ambient light. In addition, since the optical filter according to an embodiment of the present invention has a low average transmittance other than the above-described bandwidth and transmittance band, it is distinguished from a high pass filter (HPF) and a low pass filter (LPF) mainly used in circuit design.

For the optical filter according to an embodiment of the present invention, the central wavelength of the transmission band may be in the range of 800 nm to 1,650 nm. In another example, the center wavelength may be within a range of 800 nm to 1,000 nm or within a range of 1,450 nm to 1,650 nm. In the optical filter according to another embodiment, the central wavelength of the transmission band may be in the range of 850 nm to 980 nm or in the range of 880 nm to 950 nm. Alternatively, the optical filter according to another embodiment may have a central wavelength within a range of 1,500 nm to 1,600 nm or a range of 1,530 nm to 1,580 nm.

The optical filter according to an embodiment of the present invention may have the highest transmittance in the transmission band of 90% or more, 91% or more, 92% or more, 93% or more, 94% or more, 95% or more, 96% or more, 97% or more, 98% or more or 99% or more, and the upper limit of the transmittance is not particularly limited, but it may be 100% or less, 99.99% or less, or 99.9% or less. In addition, the highest transmittance within the transmission band of the optical filter may satisfy the above range regardless of the incident angle of the incident light.

The optical filter according to an embodiment of the present invention may have an average transmittance in the transmission band of 70% or more, 71% or more, 72% or more, 73% or more, 74% or more, 75% or more, 76% or more, 77% or more, 78% or more, 79% or more, 80% or more, 81% or more, 82% or more, 83% or more, 84% or more, or 85% or more. In addition, the average transmittance within the transmission band of the optical filter may satisfy the above range regardless of the incident angle of the incident light.

For the optical filter according to an embodiment of the present invention, the absolute value of $L_1$ in Equation 1 below may be 0.6 or less, 0.59 or less, 0.58 or less, 0.57 or less, 0.56 or less, 0.55 or less, 0.54 or less, or 0.53 or less. The lower limit of the absolute value of $L_1$ is not particularly limited, but it may be 0.001 or more, 0.005 or more, or 0.01 or more.

$$L_1=0.01\times(\lambda_1-\lambda_2) \qquad \text{[Equation 1]}$$

In Equation 1, $\lambda_1$ is the shortest wavelength where the optical filter exhibits a transmittance of 10% in a wavelength region of 700 nm to 2,000 nm, and $\lambda_2$ is the shortest wavelength where the optical filter exhibits a transmittance of 80% in a wavelength region of 700 nm to 2,000 nm. The $\lambda_1$ and $\lambda_2$ have the same incident angle of the incident light, and the absolute value of $L_1$ of the optical filter may satisfy the above-described range within the range of the incident angle of 0° to 30°.

For the optical filter according to an embodiment of the present invention, the absolute value of $L_2$ in Equation 2 may be 0.6 or less, 0.55 or less, 0.5 or less, 0.45 or less, 0.4 or less, or 0.35 or less. The lower limit of the absolute value of $L_2$ is not particularly limited, but it may be 0.001 or more, 0.005 or more, or 0.01 or more.

$$L_2=0.01\times(\lambda_3-\lambda_4) \qquad \text{[Equation 2]}$$

In Equation 2, $\lambda_3$ is the longest wavelength where the optical filter exhibits a transmittance of 10% in a wavelength region of 700 nm to 2,000 nm, and $\lambda_4$ is the longest wavelength where the optical filter exhibits a transmittance of 80% in a wavelength region of 700 nm to 2,000 nm. The $\lambda_3$ and $\lambda_4$ have the same incident angle of the incident light, and the absolute value of $L_2$ of the optical filter may satisfy the above-described range within the range of 0° to 30°. As the optical filter according to an embodiment of the present invention satisfies $L_1$ of Equation 1 and $L_2$ of Equation 2 within a specified range, respectively, it is possible to obtain a sharp transmittance characteristic; to effectively transmit the laser reflected from the target to the recognition sensor; and at the same time substantially to block ambient light thereby increasing the signal-to-noise ratio.

For the optical filter according to an embodiment of the present invention, the absolute value of $\Delta\lambda_{ON}$ in Equation 3 may be 5% or less, 4.5% or less, 4% or less, 3.5% or less, 3% or less, or 2.5% or less. The lower limit of the absolute value of $\Delta\lambda_{ON}$ is not particularly limited, but it may be more than 0%, 0.01% or more, or 0.1% or more.

$$\Delta\lambda_{ON}=100\times(\lambda_{ON.\ 30}-\lambda_{ON.\ 0})/\lambda_{ON.\ 0} \qquad \text{[Equation 3]}$$

In Equation 3, $\lambda_{ON.\ 0}$ is the shortest wavelength where the optical filter exhibits a transmittance of 50% in a wavelength region of 700 nm to 2,000 nm and at an incident angle of 0°, and $\lambda_{ON.\ 30}$ is the shortest wavelength where the optical filter exhibits a transmittance of 50% in a wavelength region of 700 nm to 2,000 nm and at incident angle of 30°. Since the optical filter according to an embodiment of the present invention satisfies the absolute value of $\Delta\lambda_{ON}$ of Equation 3 within the specified range, the optical characteristics do not vary greatly depending on the incident angle of the incident light, so that it can effectively transmit the laser reflected from the target to a recognition sensor, and at the same time, it can increase the signal-to-noise ratio by substantially blocking ambient light.

For the optical filter according to an embodiment of the present invention, the absolute value of $\Delta\lambda_{OFF}$ of Equation 4 below may be 5% or less, 4.5% or less, 4% or less, 3.5% or less, 3% or less, 2.5% or less, 2% or less, or 1.8% or less. The lower limit of the absolute value of $\Delta\lambda_{OFF}$ is not particularly limited, but it may be more than 0%, 0.01% or more, or 0.1% or more.

$$\Delta\lambda_{OFF}=100\times(\lambda_{OFF.\ 30}-\lambda_{OFF.\ 0})/\lambda_{OFF.\ 0} \qquad \text{[Equation 4]}$$

In Equation 4, $\Delta\lambda_{OFF.\ 0}$ is the longest wavelength where the optical filter exhibits a transmittance of 50% in a wavelength region of 700 nm to 2,000 nm and at an incident angle of 0° and $\Delta\lambda_{OFF.\ 30}$ is the longest wavelength where the optical filter exhibits a transmittance of 50% in a wavelength region of 700 nm to 2,000 nm and at an incident angle of 30°. Since the optical filter according to an embodiment of the present invention satisfies the absolute value of $\Delta\lambda_{OFF}$ of Equation 4 within the specified range, the optical characteristics do not vary greatly depending on the incident angle of the incident light, so that it can effectively transmit the laser reflected from the target to a recognition sensor, and at the same time, it can increase the signal-to-noise ratio by substantially blocking ambient light.

For the optical filter according to an embodiment of the present invention, the absolute value of $\Delta\lambda_C$ in Equation 5 below may be 5% or less, 4.5% or less, 4% or less, 3.5% or less, 3% or less, 2.5% or less, 2.3% or less, or 2.1% or less. The lower limit of the absolute value of $\Delta\lambda_C$ is not particularly limited, but it may be more than 0%, 0.01% or more, or 0.1% or more.

$$\Delta\lambda_C=100\times(\lambda_{C.\ 30}-\lambda_{C.\ 0})/\lambda_{C.\ 0} \qquad \text{[Equation 5]}$$

In Equation 5, $\lambda_{C.\ 0}$ is the central wavelength of the transmission band of the optical filter at an incident angle of 0°, and $\lambda_{C.\ 30}$ is the central wavelength of the transmission band of the optical filter at an incidence angle of 30°. Since the optical filter according to an embodiment of the present invention satisfies the absolute value of $\Delta\lambda_C$ of Equation 5 within the specified range, so that the optical characteristics do not vary greatly depending on the incident angle of the incident light, so that it can effectively transmit the laser reflected from the target to a recognition sensor, and at the same time, it can increase the signal-to-noise ratio by substantially blocking ambient light.

For the optical filter according to an embodiment of the present invention, the absolute value of $\Delta B$ of Equation 6 may be 30% or less, 29% or less, 28% or less, 27% or less, 26% or less, 25% or less, 24% or less, 23% or less, 22% or less, 21% or less, 20% or less, 19% or less, 18% or less, or 17% or less. The lower limit of the absolute value of $\Delta B$ is not particularly limited, it but may be more than 0%, 0.01% or more, 0.1% or more, or 1% or more.

$$\Delta B=100\times(B_{30}-B_0/B_0 \qquad \text{[Equation 6]}$$

In Equation 6, $B_0$ is the bandwidth of the transmission band of the optical filter at an incident angle of 0°, and $B_{30}$ is the bandwidth of the transmission band of the optical filter at an incidence angle of 30°. Since the optical filter according to an embodiment of the present invention satisfies the absolute value of $\Delta B$ in Equation 6 within the specified range, the optical characteristics do not vary greatly depending on the incident angle of the incident light, so that it can effectively transmit the laser reflected from the target to a recognition sensor, and at the same time, it can increase the signal-to-noise ratio by substantially blocking ambient light.

For the optical filter according to an embodiment of the present invention, the absolute value of $\Delta L_1$ in Equation 7 may be 3 or less, 2.9 or less, 2.8 or less, 2.7 or less, 2.6 or less, 2.5 or less, 2.4 or less, 2.3 or less, 2.2 or less, 2.1 or less or 2 or less. The lower limit of the absolute value of $\Delta L_1$ is not particularly limited, but it may be 0 or more.

$$\Delta L_1=(L_{1.30}-L_{1.0})/L_{1.0} \qquad \text{[Equation 7]}$$

Equation 7, $L_{1.30}$ is $L_1$ of Equation 1 obtained at an incident angle of 30°, and $L_{1.0}$ is $L_1$ of Equation 1 obtained at an incident angle of 0°.

$$L_1=0.01\times(\lambda_1-\lambda_2) \qquad \text{[Equation 1]}$$

In Equation 1, $\lambda_1$ is the shortest wavelength where the optical filter exhibits a transmittance of 10% in a wavelength region of 700 nm to 2,000 nm, and $\lambda_2$ is the shortest wavelength where the optical filter exhibits a transmittance of 80% in a wavelength region of 700 nm to 2,000 nm.

The absolute value of $\Delta L_2$ of Equation 8 below may be 3 or less, 2.9 or less, 2.8 or less, 2.7 or less, 2.6 or less, 2.5 or less, 2.4 or less, 2.3 or less, 2.2 or less, 2.1 or less, 2 or less, 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, or 0.5 or less. The lower limit of the absolute value of $\Delta L_2$ is not particularly limited, but it may be 0 or more.

$$\Delta L_2 = (L_{2.30} - L_{2.0})/L_{2.0} \qquad \text{[Equation 8]}$$

In Equation 8, $L_{2.30}$ is $L_2$ of Equation 2 below obtained at an incident angle of 30°, and $L_{2.0}$ is $L2$ of Equation 2 obtained at an incident angle of 0°.

$$L_2 = 0.01 \times (\lambda_3 - \lambda_4) \qquad \text{[Equation 2]}$$

In Equation 2, $\lambda_3$ is the longest wavelength where the optical filter exhibits a transmittance of 10% in a wavelength region of 700 nm to 2,000 nm, and $\lambda_4$ is the longest wavelength where the optical filter exhibits a transmittance of 80% in a wavelength region of 700 nm to 2,000 nm. Since the optical filter according to an embodiment of the present invention satisfies the absolute values of each of $\Delta L_1$ of Equation 7 and $\Delta L_2$ of Equation 8 within a prescribed range, the optical characteristics do not vary greatly depending on the angle of incidence of the incident light, so that it can effectively transmit the laser reflected from the target to a recognition sensor, and at the same time, it can increase the signal-to-noise ratio by substantially blocking ambient light.

For the optical filter according to an embodiment of the present invention, R of the following Equation 9 may be 14 or more, 14.1 or more, 14.2 or more, 14.3 or more, 14.4 or more, 14.5 or more, 14.6 or more, 14.7 or more, 14.8 or more, 14.9 or more, 15 or more, 15.1 or more, 15.2 or more, 15.3 or more, 15.4 or more, 15.5 or more, 15.6 or more, 15.7 or more, 15.8 or more, 15.9 or more, or 16 or more or 20 or less, 19.8 or less, 19.6 or less, 19.4 or less, 19.2 or less, 19 or less, 18.8 or less, 18.6 or less, 18.4 or less, 18.2 or less, 18 or less, or 17.8 or less, or it may be included between the lower limit and the upper limit.

$$R = 4 \times T/\lambda_C \qquad \text{[Equation 9]}$$

In Equation 9, T is the thickness (unit: nm) of the reflective layer, and $\lambda_C$ is the central wavelength of the transmission band of the optical filter. The thickness of the reflective layer may be measured by the following physical property measurement method for material formed on one side of the substrate. Since the optical filter according to an embodiment of the present invention satisfies R of Equation 9 within the specified range, it is possible to effectively transmit the laser reflected from the target to the recognition sensor, and at the same time, to substantially block ambient light to reduce the signal-to-noise ratio can increase For the optical filter according to an embodiment of the present invention, $R_H$ of the following Equation 10 may be 30% or more, 31% or more, 32% or more, 33% or more, 34% or more, 35% or more, 36% or more, 37% or more, 38% or more or 39% or more. The upper limit of $R_H$ is not particularly limited, but it may be 80% or less, 75% or less, 70% or less, 65% or less, 60% or less, 55% or less, or 50% or less from the viewpoint of securing a transmission band having a desired characteristic.

$$R_H = 100 \times T_H/(T_H + T_L) \qquad \text{[Equation 10]}$$

In Equation 10, $T_H$ is the total thickness of the first layer in the reflective layer, and $T_L$ is the total thickness of the second layer in the reflective layer. Since the optical filter according to an embodiment of the present invention satisfies $R_H$ of Equation 10 within the specified range, the laser reflected from the target can be effectively transmitted to a recognition sensor, and at the same time, the signal-to-noise ratio can be increased by substantially blocking ambient light.

For the optical filter according to an embodiment of the present invention, $R_{HO}$ of the following Equation 11 may be 55 or more, 55.5 or more, 56 or more, 56.5 or more, 57 or more, 57.5 or more, 58 or more, 58.5 or more, 59 or more, 59.5 or more or 80 or less, 79 or less, 78 or less, 77 or less, 76 or less, 75 or less, 74 or less, 73 or less, 72 or less, 71 or less, or 70 or less; or it may be included between the lower limit and the upper limit.

$$R_{HO} = T_{HO}/(T_{HO} + T_{LO}) \qquad \text{[Equation 11]}$$

In Equation 11, $T_{HO}$ is the optical thickness of the first layer in the reflective layer, $T_{LO}$ is the optical thickness of the second layer in the reflective layer. The optical thickness of the first layer is a product of a total thickness of the first layer in the reflective layer and the refractive index of the first layer, and the optical thickness of the second layer is a product of a total thickness of the second layer in the reflective layer and the refractive index of the second layer. Since the optical filter according to an embodiment of the present invention satisfies $R_{HO}$ of Equation 11 within the specified range, the laser reflected from the target can be effectively transmitted to a recognition sensor, and at the same time, the signal-to-noise ratio can be increased by substantially blocking ambient light.

The optical filter according to an embodiment of the present invention may have a reflective layer including a first layer that is an amorphous silicon layer and a second layer that has a lower refractive index than that of the amorphous silicon layer. For the optical filter according to an embodiment of the present invention, a plurality of the first layer and the second layer may be present in the reflective layer, respectively.

For the optical filter according to an embodiment of the present invention, the ratio $(n_1/n_2)$ of the refractive index $n_1$ of the first layer and the refractive index $n_2$ of the second layer may be 1.3 or more, 1.4 or more, 1.5 or more, 1.6 or more, 1.7 or more, 1.8 or more, 1.9 or more, 2 or more, 2.1 or more, or 2.2 or more. The upper limit of the refractive index ratio $(n_1/n_2)$ is not particularly limited, but it may be 4 or less, 3.8 or less, or 3.5 or less. The optical filter can reduce the overall filter thickness by controlling the ratio of the refractive index of the first layer and the refractive index of the second layer as described above, and can increase the signal-to-noise ratio by effectively transmitting the laser reflected from the target to the recognition sensor.

For the reflective layer of the optical filter according to an embodiment of the present invention, the first layer and the second layer may be alternately stacked with each other. For example, the first layer, the second layer, the first layer and the second layer may be alternately stacked, or the second layer, the first layer, the second layer, and the first layer may be alternately stacked.

Considering that the reflective layer of the optical filter according to an embodiment of the present invention shall have a sharp transmission band through reflection characteristics and must secure high transmittance within the transmission band, the thickness may be 2 μm or more, 2.1

µm or more, and 2.2 µm or more, 2.3 µm or more, 2.4 µm or more, 2.5 µm or more, 2.6 µm or more, 2.7 µm or more, 2.8 µm or more, 2.9 µm or more, 3 µm or more, 3.1 µm or more, 3.2 µm or more, 3.3 µm or more, 3.4 µm or more, 3.5 µm or more, 3.6 µm or more, 3.7 µm or more, 3.8 µm or more, 3.9 µm or more, or 4 µm or more or 10 µm or less, 9.8 µm or less, 9.6 µm or less, 9.4 µm or less, 9.2 µm or less, 9 µm or less, 8.8 µm or less, 8.6 µm or less, 8.4 µm or less, 8.2 µm or less, 8 µm or less, 7.8 µm or less, 7.6 µm or less, 7.4 µm or less, 7.2 µm or less, 7 µm or less, 6.8 µm or less, or 6.6 µm or less, or it may be included between the lower limit and an upper limit.

For the optical filter according to an embodiment of the present invention, to reduce the thickness of the entire filter and to increase the signal-to-noise ratio by effectively transmitting the laser reflected from the target to the recognition sensor, the thickness of the first layer and the second layer in the reflective layer may be each independently 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 21 nm or more, 22 nm or more, 23 nm or more, 24 nm or more, 25 nm or more, 26 nm or more, 27 nm or more, 28 nm or more, 29 or more, 30 nm or more, 31 nm or more, 32 nm or more, 33 nm or more, 34 nm or more, 35 nm or more, 36 nm or more, 37 nm or more, 38 nm or more, 39 nm or more, or 40 nm or more or 1,000 nm or less, 980 nm or less, 960 nm or less, 940 nm or less, 920 nm or less, 900 nm or less, 880 nm or less, 860 nm or less, 840 nm or less, 820 nm or less, 800 nm or less, 780 nm or less, 760 nm or less, or 740 nm or less, or it may be included between the lower limit and the upper limit.

For the optical filter according to an embodiment of the present invention, to reduce the thickness of the entire filter and to increase the signal-to-noise ratio by effectively transmitting the laser reflected from the target to the recognition sensor, the thickness of the first layer in the reflective layer may be 5 nm or more; 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more or more, 19 nm or more, 20 nm or more, 21 nm or more, 22 nm or more, 23 nm or more, 24 nm or more, 25 nm or more, 26 nm or more, 27 nm or more, 28 nm or more, 29 nm or more, 30 nm or more, 31 nm or more, 32 nm or more, 33 nm or more, 34 nm or more, 35 nm or more, 36 nm or more, 37 nm or more, 38 nm or more, 39 nm or more, or 40 nm or more or 500 nm or less, 490 nm or less, 480 nm or less, 470 nm or less, 460 nm or less, 450 nm or less, 440 nm or less, 430 nm or less, 420 nm or less, 410 nm or less, or 405 nm or less, or it may be included between the lower limit and the upper limit.

For the optical filter according to an embodiment of the present invention, to reduce the thickness of the entire filter and to increase the signal-to-noise ratio by effectively transmitting the laser reflected from the target to the recognition sensor, the thickness of the second layer in the reflective layer may be 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more or more, 19 nm or more, 20 nm or more, 21 nm or more, 22 nm or more, 23 nm or more, 24 nm or more, 25 nm or more, 26 nm or more, 27 nm or more, 28 nm or more, 29 nm or more, 30 nm or more, 31 nm or more, 32 nm or more, 33 nm or more, 34 nm or more, 35 nm or more, 36 nm or more, 37 nm or more, 38 nm or more, 39 nm or more, or 40 nm or more or 1,000 nm or less, 980 nm or less, 960 nm or less, 940 nm or less, 920 nm or less, 900 nm or less, 880 nm or less, 860 nm or less, 840 nm or less, 820 nm or less, 800 nm or less, 780 nm or less, 760 nm or less, or 740 nm or less, or it may be included between the lower limit and an upper limit.

For the optical filter according to an embodiment of the present invention, to reduce the thickness of the entire filter and to increase the signal-to-noise ratio by effectively transmitting the laser reflected from the target to the recognition sensor, the average thickness of the first layer and the second layer in the reflective layer may be each independently 80 nm or more, 82 nm or more, 84 nm or more, 86 nm or more, 88 nm or more, 90 nm or more, 92 nm or more, 94 nm or more, 96 nm or more, 98 nm or more, 100 nm or more, 102 nm or more or more, 104 nm or more, 106 nm or more, or 108 nm or more or 400 nm or less, 390 nm or less, 380 nm or less, 370 nm or less, 360 nm or less, 350 nm or less, 340 nm or less, 330 nm or less, 320 nm or less, 310 nm or less, 300 nm or less, 290 nm or less, 280 nm or less, 270 nm or less, or 260 nm or less, or it may be included between the lower limit and the upper limit. Here, for each of the plurality of first and second layers, the average thickness of the first layer means a value obtained by summing up the thicknesses of all the first layers in the reflective layer and then dividing by the number of layers of the first layer. The average thickness of the second layer means a value obtained by summing up the thicknesses of all the second layers in the reflective layer and then divided by the number of layers of the second layer.

For the optical filter according to an embodiment of the present invention, to reduce the thickness of the entire filter and to increase the signal-to-noise ratio by effectively transmitting the laser reflected from the target to the recognition sensor, the average thickness of the first layer in the reflective layer may be 80 nm or more, 82 nm or more, 84 nm or more, 86 nm or more, 88 nm or more, 90 nm or more, 92 nm or more, 94 nm or more, 96 nm or more, 98 nm or more, 100 nm or more, 102 nm or more, 104 nm or more, 106 nm or more, or 108 nm or more or 300 nm or less, 290 nm or less, 280 nm or less, 270 nm or less, 260 nm or less, 250 nm or less, 240 nm or less, 230 nm or less, 220 nm or less, 210 nm or less, 200 nm or less, or 180 nm or less, or it may be included between the lower limit and the upper limit.

For the optical filter according to an embodiment of the present invention, to reduce the thickness of the entire filter and to increase the signal-to-noise ratio by effectively transmitting the laser reflected from the target to the recognition sensor, the average thickness of the second layer in the reflective layer may be 80 nm or more, 82 nm or more, 84 nm or more, 86 nm or more, 88 nm or more, 90 nm or more, 92 nm or more, 94 nm or more, 96 nm or more, 98 nm or more, 100 nm or more, 102 nm or more, 104 nm or more, 106 or more, or 108 nm or more or 400 nm or less, 390 nm or less, 380 nm or less, 370 nm or less, 360 nm or less, 350 nm or less, 340 nm or less, 330 nm or less, 320 nm or less, 310 nm or less, 300 nm or less or less, 290 nm or less, 280 nm or less, 270 nm or less, or 260 nm or less, or it may be included between the lower limit and the upper limit.

For the optical filter according to an embodiment of the present invention, the total number of layers of the first layer and the second layer in the reflective layer may be 20 layers or more, 21 layers or more, 22 layers or more, or 23 layers or more or 150 layers or less, 140 layers or less, 130 layers or less, 120 layers or less, 110 layers or less, 100 layers or less, 90 layers or less, 80 layers or less, 70 layers or less, 60 layers or less, 50 layers or less, or 40 layers or less, or it may be included between the lower limit and the upper limit.

For the optical filter according to an embodiment of the present invention, the total number of layers of the first and the second layers in the reflective layer may be in a range of 20 to 150 layers, and a ratio ($L_{1+2}/L_T$) between the total number of layers of the first and second layers ($L_{1+2}$) in the reflective layer and a number of layers of entire sub-layers ($L_T$) may be 0.85 or more, 0.86 or more, 0.87 or more, 0.88 or more, 0.89 or more, 0.9 or more, 0.91 or more, 0.92 or more, 0.93 or more, 0.94 or more, or 0.95 or more or 1 or less, or it may be included between the lower limit and the upper limit. The term "sub-layer" used in the present invention may refer to one of a plurality of layers in the reflective layer. For the optical filter according to an embodiment of the present invention, by controlling the total number of layers of the first and the second layers in the reflective layer and the ratio ($L_{1+2}/L_T$) as described above, it is possible to increase the signal-to-noise ratio by effectively transmitting the laser reflected from the target to the recognition sensor.

For the optical filter according to an embodiment of the present invention, the ratio ($T_1/T_2$) between the total number of layers of the first layer ($T_1$) and the total number of layers of the second layer ($T_2$) in the reflective layer may be 0.5 or more, 0.52 or more, 0.54 or more, 0.56 or more, 0.58 or more, 0.6 or more, 0.62 or more, 0.64 or more, or 0.66 or more or 1.5 or less, 1.4 or less, 1.3 or less, 1.2 or less, 1.1 or less, 1 or less, or 0.95 or less, or it may be included between the lower limit and the upper limit. The optical filter according to an embodiment of the present invention may increase the signal-to-noise ratio by effectively transmitting the laser reflected from the target to the recognition sensor by controlling the ratio ($T_1/T_2$) between the total number of layers of the first layer ($T_1$) and the total number of layers of the second layer ($T_2$) in the reflective layer as described above.

For the optical filter according to an embodiment of the present invention, the amorphous silicon layer constituting the first layer may include amorphous silicon tuned to satisfy the optical properties listed below. The optical filter according to an embodiment of the present invention comprises an amorphous silicon layer including an appropriately tuned amorphous silicon as a first layer, and the characteristics of the first layer (thickness, a portion occupied by the reflective layer, the number of layers, etc.). The desired optical properties may be obtained through a combination of the properties (thickness, a portion occupied by the reflective layer, the number of layers, etc.) of the second layer having a lower refractive index than that of the amorphous silicon layer.

For the optical filter according to an embodiment of the present invention, the first layer or the amorphous silicon layer may have a refractive index at a wavelength of 940 nm of 3.3 or more, 3.31 or more, 3.32 or more, 3.33 or more, 3.34 or more, 3.35 or more, 3.36 or more, 3.37 or more, 3.38 or more, 3.39 or more, 3.4 or more, 3.41 or more, 3.42 or more, 3.43 or more or 3.44 or more or 4.5 or less, 4.4 or less, 4.3 or less, 4.2 or less, 4.1 or less, 4 or less, 3.9 or less, or 3.8 or less, or it may be included between the lower and the upper limit.

Alternatively, for the optical filter according to an embodiment of the present invention, the first layer or the amorphous silicon layer may have a refractive index at a wavelength of 1,550 nm of 3.1 or more, 3.11 or more, 3.12 or more, 3.13 or more, 3.14 or more, 3.15 or more, 3.16 or more, 3.17 or more of or more, 3.18 or more, 3.19 or more, 3.2 or more, 3.21 or more, 3.22 or more, 3.23 or more, 3.24 or more, 3.25 or more, 3.26 or more, or 3.27 or more or 4.5 or less, 4.4 or less, 4.3 or less, 4.2 or less, 4.1 or less, 4 or less, 3.9 or less, 3.8 or less, 3.7 or less, or 3.5 or less, or it may be included between the lower limit and the upper limit. For the optical filter according to an embodiment of the present invention, the first layer or the amorphous silicon layer may serve as a high refractive index layer by satisfying the above-described range of the refractive index at a wavelength of 940 nm or 1,550 nm.

For the optical filter according to an embodiment of the present invention, the first layer or the amorphous silicon layer may have the extinction coefficient K of zero at any one of the thicknesses within a thickness range of 60 nm to 300 nm, 65 nm to 250 nm, or 68 nm to 200 nm and at any one of the wavelengths within range of 800 nm to 900 nm, 820 nm to 890 nm or 840 nm to 880 nm. For the optical filter according to an embodiment of the present invention, by tuning the first layer or the amorphous silicon layer to be the extinction coefficient K of 0 at any one thickness within the thickness range and at any one wavelength within the wavelength range, the desired optical properties can be obtained with a combination of the properties of the first layer (thickness, a portion occupied by the reflective layer, the number of layers, etc.) and the properties of the second layer having a lower refractive index than the amorphous silicon layer (thickness, a portion occupied by the reflective layer, the number of layers, etc.).

For the optical filter according to an embodiment of the present invention, the first layer or the amorphous silicon layer may be formed through a vapor deposition to satisfy the aforementioned characteristics of the refractive index and the extinction coefficient K. In other words, the tuning may be performed by the vapor deposition, and the vapor deposition may use a method generally used in the art, for example, the deposition may be preferably performed by one of selected from a group consisted of a chemical vapor deposition, a thermal evaporation, an electron beam deposition (E-Beam Evaporation), a sputtering or an atomic layer deposition.

For the optical filter according to an embodiment of the present invention, when the first layer or the amorphous silicon layer is formed, the above-described refractive index and the extinction coefficient K can be satisfied by controlling the deposition temperature being set to 200° C. or higher, 205° C. or higher, 210° C. or higher, 215° C. or higher, 220° C. or higher, 225° C. or higher, 230° C. or higher. ° C. or higher, 235° C. or higher, 240° C. or higher, 245° C. or higher or 250° C. or higher or 400° C. or lower, 390° C. or lower, 380° C. or lower, 370° C. or lower, 360° C. or lower, or 350° C. or lower, or being included between the lower and upper limit.

For the optical filter according to an embodiment of the present invention, the tuned amorphous silicon may have a measured Raman peak of 495 cm$^{-1}$ or more, 495.1 cm$^{-1}$ or more, 495.2 cm$^{-1}$ or more, 495.3 cm$^{-1}$ or more, 495.4 cm$^{-1}$ or more, 495.5 cm$^{-1}$ or more, 495.6 cm$^{-1}$ or more, 495.7 cm$^{-1}$ or more, or 495.8 cm$^{-1}$ or more. The Raman peak means a value measured according to the following physical property measurement method. In addition, the tuned amorphous silicon may have a Raman peak of 500 cm$^{-1}$ or less, 499.9 cm$^{-1}$ or less, 499.8 cm$^{-1}$ or less, 499.7 cm$^{-1}$ or less, 499.6 cm$^{-1}$ or less, 499.5 cm$^{-1}$ or less, 499.4 cm$^{-1}$ or less, or 499.3 cm$^{-1}$ or less. The measured Raman peak may be measured according to the evaluation of the Raman spectrum described in the following method for measuring physical properties.

By tuning the amorphous silicon in the same manner as described above, the desired optical properties can be obtained with a combination of the properties of the first layer (thickness, a portion occupied by the reflective layer, the number of layers, etc.) and the properties of the second layer having a lower refractive index than the amorphous silicon layer (thickness, a portion occupied by the reflective layer, the number of layers, etc.).

For the optical filter according to an embodiment of the present invention, as described above, the second layer has a lower refractive index than that of the first layer. Specifically, the second layer has a lower refractive index than the first layer at the same measurement wavelength.

For the optical filter according to an embodiment of the present invention, the second layer may have a refractive index at a wavelength of 940 nm of 2.5 or less, 2.4 or less, 2.3 or less, 2.2 or less, 2.1 or less, 2 or less, 1.9 or less, 1.8 or less, 1.7 or less, 1.6 or less, or 1.5 or less or 1 or more, 1.1 or more, 1.2 or more, or 1.3 or more, or it may be included between the lower limit and the lower limit. For the optical filter according to an embodiment of the present invention, the second layer may have a refractive index at a wavelength of 1,550 nm of 2.5 or less, 2.4 or less, 2.3 or less, 2.2 or less, 2.1 or less, 2 or less, 1.9 or less, 1.8 or less, 1.7 or less, 1.6 or less, or 1.5 or less or 1 or more, 1.1 or more, 1.2 or more, or 1.3 or more, or it may be included between the lower limit and the lower limit. For the optical filter according to an embodiment of the present invention, by satisfying the above-described range of the refractive index at a wavelength of 940 nm or 1,550 nm, the second layer may serve as a low refractive indexed layer.

For the optical filter according to an embodiment of the present invention, the second layer may include an oxide-based compound exemplified by $SiO_2$, $Ta_2O_5$, $Ti_3O_5$ or $Nb_2O_5$ or a fluoride-based compound exemplified by $Na_5Al_3F_{14}$, $Na_3AlF_6$ or $MgF_2$. In other words, the second layer may include at least one or more selected from a group consisted of the oxide-based compounds and the fluoride-based compounds, or may include at least one or more selected from a group consisted of $SiO_2$, $Ta_2O_5$, $Ti_3O_5$, $Nb_2O_5$, $Na_5Al_3F_{14}$, $Na_3AlF_6$ and $MgF_2$. It is not particularly limited to those examples above, and materials used in the art may be used as long as the refractive index conditions described above are satisfied. The above-mentioned third layer may also use the above material independently as the above-mentioned second layer.

For the optical filter according to an embodiment of the present invention, the second layer may be formed through a vapor deposition. The vapor deposition may use a method generally used in the art, for example, the deposition may be preferably performed by one of selected from a group consisted of a chemical vapor deposition, a thermal evaporation, an electron beam deposition (E-Beam Evaporation), a sputtering or an atomic layer deposition.

For the optical filter according to an embodiment of the present invention, the reflective layer may further include a third layer other than the first layer and the second layer. The third layer may have a lower refractive index than the first layer. Specifically, the third layer may have a lower refractive index than the first layer at the same measurement wavelength. For the optical filter according to an embodiment of the present invention, a plurality of the first layer, the second layer, and the third layer may each exist in the reflective layer.

For the optical filter according to an embodiment of the present invention, the ratio $n_1/n_3$ of the refractive index $n_1$ of the first layer and the refractive index $n_3$ of the third layer may be 1.3 or more, 1.4 or more, 1.5 or more, 1.6 or more, 1.7 or more, 1.8 or more, 1.9 or more, 2 or more, 2.1 or more, or 2.2 or more. The upper limit of the refractive index ratio $(n_1/n_3)$ is not particularly limited, but it may be 4 or less, 3.8 or less, or 3.5 or less. The optical filter can reduce the thickness of the entire filter by controlling the ratio of the refractive index of the first layer and the refractive index of the third layer as described above, and can increase the signal-to-noise ratio by effectively transmitting the laser reflected from the target to a recognition sensor.

The reflective layer of the optical filter according to an embodiment of the present invention, the first layer, the second layer, and the third layer may be alternately stacked with each other. For example, the first layer, the second layer, the third layer, the first layer, the second layer and the third layer may be alternately stacked; the second layer, the third layer, the first layer, the second layer the third layer and the first layer may be alternately stacked; or the third layer, the first layer, the second layer, the third layer, the first layer and the second layer may be alternately stacked.

For the optical filter according to an embodiment of the present invention, to reduce the thickness of the entire filter and to increase the signal-to-noise ratio by effectively transmitting the laser reflected from the target to the recognition sensor, the thickness of each of the first layer, the second layer and the third layer in the reflective layer may be independently 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 21 nm or more, 22 nm or more, 23 nm or more, 24 nm or more, 25 nm or more, 26 nm or more, 27 nm or more, 28 nm or more, 29 nm or more, 30 nm or more, 31 nm or more, 32 nm or more, 33 nm or more, 34 nm or more, 35 nm or more, 36 nm or more, 37 nm or more, 38 nm or more, 39 nm or more, or 40 nm or more or 1,000 nm or less, 980 nm or less, 960 nm or less, 940 nm or less, 920 nm or less, 900 nm or less, 880 nm or less, 860 nm or less, 840 nm or less, 820 nm or less, 800 nm or less, 780 nm or less, 760 nm or less or 740 nm or less, or it may be included between the lower limit and the upper limit.

For the optical filter according to an embodiment of the present invention, to reduce the thickness of the entire filter and to increase the signal-to-noise ratio by effectively transmitting the laser reflected from the target to the recognition sensor, the thickness of the third layer in the reflective layer may be 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more or more, 19 nm or more, 20 nm or more, 21 nm or more, 22 nm or more, 23 nm or more, 24 nm or more, 25 nm or more, 26 nm or more, 27 nm or more, 28 nm or more, 29 nm or more, 30 nm or more, 31 nm or more, 32 nm or more, 33 nm or more, 34 nm or more, 35 nm or more, 36 nm or more, 37 nm or more, 38 nm or more, 39 nm or more, or 40 nm or more or 1,000 nm or less, 980 nm or less, 960 nm or less, 940 nm or less, 920 nm or less, 900 nm or less, 880 nm or less, 860 nm or less, 840 nm or less, 820 nm or less, 800 nm or less, 780 nm or less, 760 nm or less, or 740 nm or less, or it may be included between the lower limit and an upper limit.

For the optical filter according to an embodiment of the present invention, to reduce the thickness of the entire filter and to increase the signal-to-noise ratio by effectively transmitting the laser reflected from the target to the recognition sensor, the average thickness of the first layer and the third layer in the reflective layer may be each independently 80 nm or more, 82 nm or more, 84 nm or more, 86 nm or more, 88 nm or more, 90 nm or more, 92 nm or more, 94 nm or more, 96 nm or more, 98 nm or more, 100 nm or more, 102 nm or more or more, 104 nm or more, 106 nm or more, or 108 nm or more or 400 nm or less, 390 nm or less, 380 nm or less, 370 nm or less, 360 nm or less, 350 nm or less, 340 nm or less, 330 nm or less, 320 nm or less, 310 nm or less, 300 nm or less, 290 nm or less, 280 nm or less, 270 nm or less, or 260 nm or less, or it may be included between the lower limit and the upper limit. Here, for each of the plurality of first and third layers, the average thickness of the first layer means a value divided by the number of layers of the first layer after summing up the thicknesses of all the first layers in the reflective layer and the average thickness of the third layer means a value divided by the number of layers of the third layer after summing up the thickness of all the third layers in the reflective layer.

For the optical filter according to an embodiment of the present invention, to reduce the thickness of the entire filter and to increase the signal-to-noise ratio by effectively transmitting the laser reflected from the target to the recognition sensor, the average thickness of the third layer in the reflective layer may be 80 nm or more, 82 nm or more, 84 nm or more, 86 nm or more, 88 nm or more, 90 nm or more, 92 nm or more, 94 nm or more, 96 nm or more, 98 nm or more, 100 nm or more, 102 nm or more, 104 nm or more, 106 or more, or 108 nm or more or 400 nm or less, 390 nm or less, 380 nm or less, 370 nm or less, 360 nm or less, 350 nm or less, 340 nm or less, 330 nm or less, 320 nm or less, 310 nm or less, 300 nm or less or less, 290 nm or less, 280 nm or less, 270 nm or less, or 260 nm or less, or it may be included between the lower limit and the upper limit.

For the optical filter according to an embodiment of the present invention, the total number of layers of the first layer, the second layer, and the third layer in the reflective layer may be 20 layers or more, 21 layers or more, 22 layers or more, or 23 layers or more or 150 layers or less, 140 layers or less, 130 layers or less, 120 layers or less, 110 layers or less, 100 layers or less, 90 layers or less, 80 layers or less, 70 layers or less, 60 layers or less, 50 layers or less, or 40 layers or less, or it may be included between the lower and upper limit.

For the optical filter according to an embodiment of the present invention, the total number of layers of the first layer, the second layer, and the third layer in the reflective layer may be in the range of 20 to 150 layers. The ratio ($L_{1+2+3}$/$L_T$) between the total number of layers ($L_{1+2+3}$) of the first layer, the second layer, and the third layer and the number of layers ($L_T$) of all sub-layers may be 0.85 or more, 0.86 or more, 0.87 or more, 0.88 or more, 0.89 or more, 0.9 or more, 0.91 or more, 0.92 or more, 0.93 or more, 0.94 or more, or 0.95 or more or 1 or less, or it may be included between the lower limit and the upper limit.

For the optical filter according to an embodiment of the present invention, by controlling the total number of layers of the first, the second, and the third layer in the reflective layer and the ratio ($L_{1+2+3}$/$L_T$) as described above, it is possible to increase the signal-to-noise ratio by effectively transmitting the laser reflected from the target to the recognition sensor.

For the optical filter according to an embodiment of the present invention, the ratio $T_1/T_3$ between the total number of layers of the first layer ($T_1$) and the total number of layers of the third layer ($T_3$) in the reflective layer may be 0.5 or more, 0.52 or more, 0.54 or more, 0.56 or more, 0.58 or more, 0.6 or more, 0.62 or more, 0.64 or more, or 0.66 or more or 1.5 or less, 1.4 or less, 1.3 or less, 1.2 or less, 1.1 or less, 1 or less, or 0.95 or less, or it may be included between the lower limit and the upper limit. The optical filter according to an embodiment of the present invention may increase the signal-to-noise ratio by effectively transmitting the laser reflected from the target to the recognition sensor by controlling the ratio of the total number of layers of the first layer and the third layer as described above.

For the optical filter according to an embodiment of the present invention, the ratio ($T_1/T_{2+3}$) between the total number of layers of the first layer ($T_1$) and the total number of layers of the second and third layer ($T_{2+3}$) in the reflective layer may be 0.2 or more, 0.25 or more, 0.3 or more, 0.33 or more, 0.4 or more, 0.45 or more, 0.5 or more, 0.55 or more, 0.6 or more, or 0.65 or more or 1.5 or less, 1.4 or less, 1.3 or less, 1.2 or less, 1.1 or less, 1 or less, or 0.95 or less, or it may be included between the lower limit and the upper limit. The optical filter according to an embodiment of the present invention may increase the signal-to-noise ratio by effectively transmitting the laser reflected from the target to the recognition sensor by controlling the $T_1/T_{2+3}$ ratio as described above.

For the optical filter according to an embodiment of the present invention, the third layer may have a refractive index at a wavelength of 940 nm of 2.5 or less, 2.4 or less, 2.3 or less, 2.2 or less, 2.1 or less, 2 or less, 1.9 or less, 1.8 or less, 1.7 or less, 1.6 or less, 1.5 or less or 1 or more, 1.1 or more, 1.2 or more, or 1.3 or more, or it may be included between the lower limit and the lower limit. For the optical filter according to an embodiment of the present invention, the third layer may have a refractive index at a wavelength of 1,550 nm of 2.5 or less, 2.4 or less, 2.3 or less, 2.2 or less, 2.1 or less, 2 or less, 1.9 or less, 1.8 or less, 1.7 or less, 1.6 or less, 1.5 or less or 1 or more, 1.1 or more, 1.2 or more, or 1.3 or more, or it may be included between the lower limit and the lower limit. The third layer can serve as a low refractive indexed layer as the second layer because the refractive index at a wavelength of 940 nm or 1,550 nm satisfies the above range.

For the optical filter according to an embodiment of the present invention, the third layer may include an oxide-based compound exemplified by $SiO_2$, $Ta_2O_5$, $Ti_3O_5$ or $Nb_2O_5$ or a fluoride-based compound exemplified by $Na_5Al_3F_{14}$, $Na_3AlF_6$ or $MgF_2$. In other words, the third layer may include at least one or more selected from a group consisted of the oxide-based compounds and the fluoride-based compounds, or may include at least one or more selected from a group consisted of $SiO_2$, $Ta_2O_5$, $Ti_3O_5$, $Nb_2O_5$, $Na_5Al_3F_{14}$, $Na_3AlF_6$ and $MgF_2$. It is not particularly limited to those examples above, and materials used in the art may be used as long as the refractive index conditions described above are satisfied. Here, the third layer may use the same or different material as the second layer. The above-mentioned third layer may also use the above material independently as the above-mentioned second layer. For the optical filter according to an embodiment of the present invention, the third layer may be formed through a vapor deposition and it may refer a method for forming the second layer.

For the optical filter according to an embodiment of the present invention, the reflective layer may further include a layer other than the first layer, the second layer, and the third layer. The optical filter according to an embodiment of the present invention may include a substrate as described above. The substrate serves as a support for the optical filter according to an embodiment of the present invention, and it may have high visible light transmittance and transparency. To have these properties, material having high visible light transmittance and transparency may be used as the substrate. Here, the high visible light transmittance means that the average transmittance in the visible light region is 70% or more, 75% or more, or 80% or more.

For the optical filter according to an embodiment of the present invention, the substrate may use a glass substrate or a resin substrate. The glass substrate and the resin substrate may be used without limitation as long as the average transmittance in the visible light region satisfies the above range and is used in the art. The resin substrate may be, for example, a substrate such as polyethylene terephthalate (PET), polyethylene (PE), and polyimide (PI), but it is not limited thereto.

For the optical filter according to an embodiment of the present invention, the thickness of the substrate is not particularly limited and may be selected within a variety of ranges in consideration of various purposes. But, for considering the tendency of the filter being thin, it may have a thickness of 1,000 µm or less, 900 µm or less, 800 µm or less, 700 µm or less, 600 µm or less, 500 µm or less, 400 µm or less, 300 µm or less, or 250 µm or less. The lower limit as to the thickness of the substrate is not particularly set, and it is sufficient as long as it is proper for the deposition of the reflective layer or the mechanical strength of the optical filter can be properly secured. For example, the substrate may have a thickness of 10 µm or more or 50 µm or more.

The LiDAR system according to an embodiment of the present invention may include the optical filter according to the above-described embodiment of the present invention. By including the optical filter, the LiDAR system can effectively transmit the laser reflected from the target to a recognition sensor and at the same time substantially block ambient light thereby increasing the signal-to-noise ratio.

The LiDAR system according to an embodiment of the present invention may be a LiDAR device itself utilizing the LiDAR technology, or may include the LiDAR device. For the structure of the LiDAR system and the LiDAR technology, it may be referred to Korean Patent Application Laid-Open No. 10-2019-0066349.

Below, an optical filter of the present invention will be described in detail through Embodiments, but the scope of the optical filter of the present invention is not limited by the following Embodiments.

Method of Measuring Physical Properties

1. Evaluation of Transmittance or Reflectance Spectrum

The transmittance spectrum or the reflectance spectrum was measured by a spectrophotometer (Perkinelmer, Product Name: Lambda750) for a specimen prepared by depositing a reflective layer on a glass substrate having a width and length of 125 mm, respectively, and a thickness of about 0.2 mm. The transmittance or the reflectance was measured for each wavelength and incident angle according to the manual of the equipment. The specimen was placed on a straight line between the measuring beam of the spectrophotometer and the detector, and the transmittance or the reflectance was measured while changing the incident angle of the measuring beam from 0° to 30°. Unless otherwise specified, the transmittance or the reflectance results in this embodiment are the results when the incident angle is 0°.

2. Evaluation of Refractive Index and Extinction Coefficient (K)

The refractive index and the extinction coefficient were measured by an ellipsometer (Elli-SEDN) instrument in a wavelength range of 220 to 1,650 nm at room temperature (about 25° C.). For example, the refractive index and the extinction coefficient of a first layer were evaluated by an ellipsometry method after forming the first layer on the glass substrate to be the minimum, average and maximum thickness within a design thickness range, respectively. The refractive index and the extinction coefficient of a second layer were also evaluated in the same manner as for the first layer. The refractive index and the extinction coefficient were confirmed by applying the optimal dispersion equation to the measured data.

3. Evaluation of Raman Spectrum

The Raman spectrum was measured from a specimen cut to a size of about 30 mm horizontally and vertically (thickness of at least 30 nm or more is sufficiently enough to prevent a shift phenomenon caused by quantum effect, and the measurement value of the Raman spectrum will not be changed above the thickness) by using a Raman spectrometer (Renishaw 514 nm). The measured Raman shift range was $1,000 \text{ cm}^{-1}$ to $100 \text{ cm}^{-1}$, and the intensity was measured while changing by $1 \text{ cm}^{-1}$, and this step was repeated three times over the Region 1, Region 2 and Region 3. Normalized Raman spectra plotted from the normalized intensity for each region were obtained. A value obtained by arithmetic average of each Raman shift value at the point with the highest intensity in the normalized Raman spectrum was measured as a Raman peak. The normalized intensity was calculated as a value $(I_p/I_{max})$ of the intensity $(I_p)$ at each point with respect to the highest intensity $(I_{max})$ among the measured intensities.

4. Evaluation of Layer Thickness

The thickness of each of the first layer and the second layer was measured through a TEM (Transmission Electron Microscope) image by observing a prepared measurement specimen showing a cross-section of the reflective layer. The TEM image was obtained using JEOL's FE-TEM (JEM-F200). The measurement specimen was prepared by using a Focused Ion Beam (FIB) (Quanta 3D FEG) manufactured by FEI. The TEM image was obtained with a 200 kV accelerating voltage and magnified by a magnification of $20 \times 10^3$ times.

PREPARATION OF EMBODIMENTS AND COMPARATIVE EXAMPLE

1. Embodiment 1

As a substrate, a glass substrate showing the transmittance spectrum as shown in FIG. 1 was used. The glass substrate had a thickness of about 200 µm, and a refractive index of about 1.51 for light having a wavelength of 940 nm.

The reflective layer was formed by alternately repeatedly stacking an amorphous silicon layer and an $SiO_2$ layer on one surface of the glass substrate. In the above, the amorphous silicon layer and the $SiO_2$ layer were formed by an E-beam evaporator method.

The vacuum level and temperature conditions for the deposition were $1.0 \times 10^{-5}$ Torr and 250 to 350° C., respectively. The amorphous silicon was formed by a deposition condition set to be as: a deposition rate of 4 Å/s and an E-beam current of 250 mA. $SiO_2$ was formed by a deposition condition set to be as: a deposition rate of 7 Å/s and an E-beam current of 310 mA.

Table 1 below shows the refractive index with respect to each thickness and the wavelength exhibiting the extinction coefficient K of zero for the amorphous silicon layer formed in the above manner. The refractive indices measured in Table 1 below are for light with wavelengths of 940 nm and 1,550 nm.

TABLE 1

| Thickness (nm) | Refractive Index (940 nm) | Refractive Index (1,550 nm) | Wavelength for Extinction Coefficient K of Zero (nm) |
|---|---|---|---|
| 63.86 | 3.58835 | 3.41730 | 866 |
| 69.67 | 3.65955 | 3.48800 | 865 |
| 74.75 | 3.60822 | 3.44339 | 861 |
| 136.44 | 3.51760 | 3.35073 | 844 |
| 139.39 | 3.51224 | 3.34811 | 843 |
| 146.88 | 3.56555 | 3.39412 | 858 |
| 149.74 | 3.54180 | 3.37355 | 843 |
| 152.25 | 3.44461 | 3.27979 | 853 |
| 195.03 | 3.57876 | 3.40798 | 872 |
| 195.15 | 3.57719 | 3.40628 | 873 |
| 216.12 | 3.60576 | 3.43136 | 874 |
| 223.88 | 3.58815 | 3.41247 | 878 |

Figure 2:
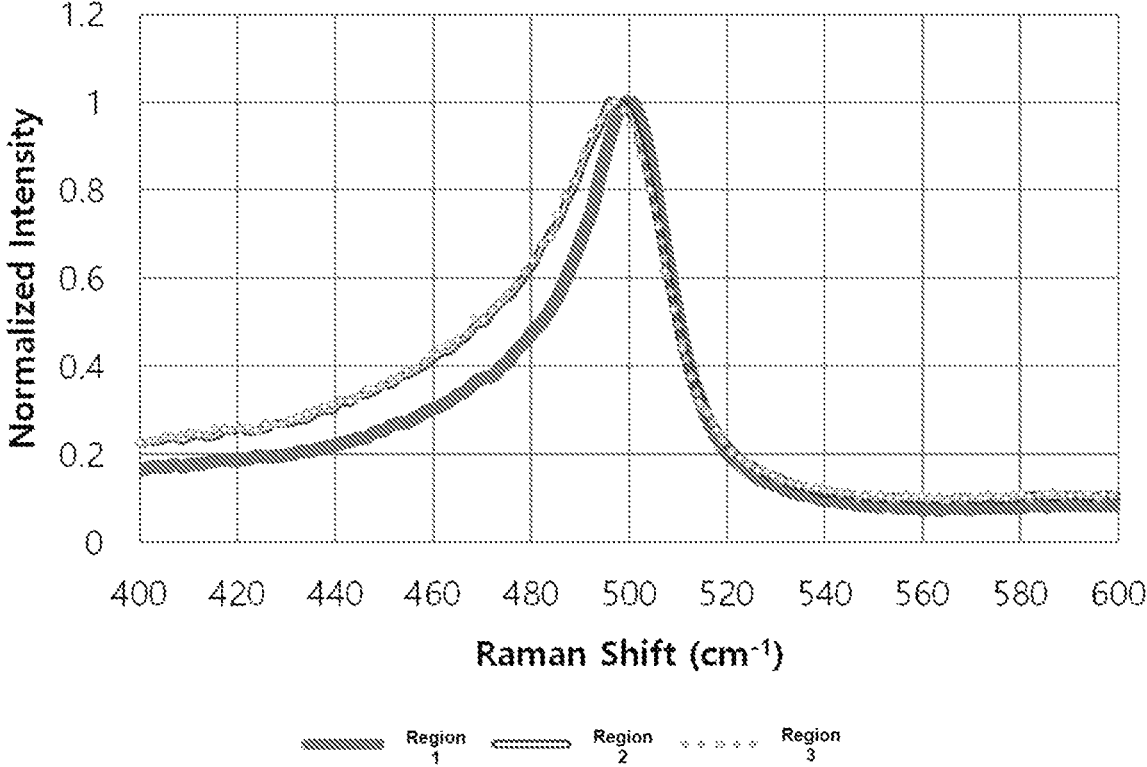
FIG. 2 shows a Raman spectrum of an amorphous silicon layer having a thickness of about 70 nm, a refractive index of about 3.49107 with respect to light having a wavelength of 1,550 nm, and an extinction coefficient K of 0.

In addition, FIG. 2 is the Raman spectrum for the amorphous silicon layer having a thickness of about 70 nm, a refractive index of about 3.49107 with respect to light having a wavelength of 1,550 nm, and the extinction coefficient K of 0. The Raman peak obtained from the spectrum is about 497.537 $cm^{-1}$ (Region 1: 499.237 $cm^{-1}$, Region 2: 495.837 $cm^{-1}$ and Region 3: 497.537 $cm^{-1}$).

On the other hand, the formed $SiO_2$ layer exhibited a refractive index of about 1.46 at a thickness of 160 nm. Because there is almost no difference in refractive index due to the thickness difference, the refractive index of all $SiO_2$ layers in Table 2 below is about 1.46. The thickness of each layer in the reflective layer was adjusted as shown in Table 2 below.

In Table 2, a-Si means the amorphous silicon layer, the layer number 1 is the first layer formed on the glass substrate, and the layer number 23 is the last layer formed.

TABLE 2

| Layer Number | Material | Thickness (nm) |
|---|---|---|
| 1 | $SiO_2$ | 32.5 |
| 2 | a-Si | 140.24 |
| 3 | $SiO_2$ | 51.55 |
| 4 | a-Si | 248.63 |
| 5 | $SiO_2$ | 122.4 |
| 6 | a-Si | 149.4 |
| 7 | $SiO_2$ | 257.82 |
| 8 | a-Si | 260.28 |
| 9 | $SiO_2$ | 170.32 |
| 10 | a-Si | 66.78 |
| 11 | $SiO_2$ | 181.63 |
| 12 | a-Si | 259.49 |
| 13 | $SiO_2$ | 168.66 |
| 14 | a-Si | 66.4 |
| 15 | $SiO_2$ | 171.84 |
| 16 | a-Si | 249.34 |
| 17 | $SiO_2$ | 140.85 |
| 18 | a-Si | 121.16 |
| 19 | $SiO_2$ | 169.58 |
| 20 | a-Si | 192.63 |
| 21 | $SiO_2$ | 388.71 |
| 22 | a-Si | 152.13 |
| 23 | $SiO_2$ | 291.32 |

Figure 3:
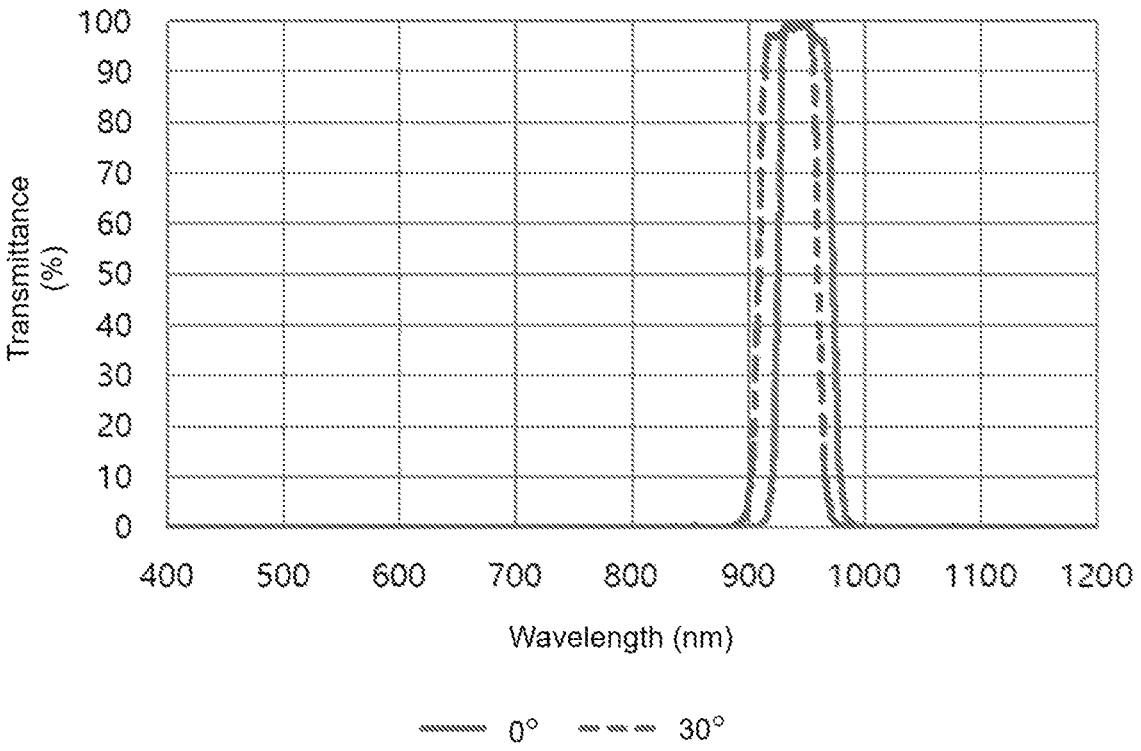
FIG. 3 shows the transmittance spectrum of an optical filter according to Embodiment 1 (0° and 30° mean incident angles of incident light).

FIG. 3 is a transmittance spectrum for the optical filter formed in the above manner. The transmittance characteristics of the optical filter are shown in Table 3 below.

TABLE 3

| Optical Properties | Incident Angle of 0° | Incident Angle of 30° |
|---|---|---|
| Central Wavelength (nm) | 948 | 928.8 |
| Transmittance at Central Wavelength (%) | 99.62 | 99.91 |
| Average Transmittance within Transmittance Band (%) | 90.35 | 91.96 |
| Average Transmittance outside Transmittance Band (%) | 0.33 | 0.53 |
| $\lambda_1$ (unit: nm) | 917.0 | 901.0 |
| $\lambda_2$ (unit: nm) | 928.6 | 912.6 |
| $\lambda_3$ (unit: nm) | 980.9 | 973.0 |
| $\lambda_4$ (unit: nm) | 966.0 | 949.9 |
| $\lambda_{ON. n}$ (unit: nm) | 923.6 | 907.6 |
| $\lambda_{OFF. n}$ (unit: nm) | 972.4 | 959.8 |
| Bandwidth (unit: nm) | 48.8 | 52.2 |

In Table 3, $\lambda_1$ is the shortest wavelength where the optical filter exhibits a transmittance of 10% in a wavelength region of 700 nm to 2,000 nm, and $\lambda_2$ is the shortest wavelength where the optical filter exhibits a transmittance of 80% in a wavelength region of 700 nm to 2,000 nm. In addition, in Table 3, $\lambda_3$ is the longest wavelength where the optical filter exhibits a transmittance of 10% in a wavelength region of 700 nm to 2,000 nm, and $\lambda_4$ is the longest wavelength where the optical filter exhibits a transmittance of 80% in a wavelength region of 700 nm to 2,000 nm. In addition, in Table 3, $\lambda_{ON. n}$ is the shortest wavelength where the optical filter exhibits a transmittance of 50% in a wavelength region of 700 nm to 2,000 nm and at the incident angle of 0°, and n is the number of the incident angle. In addition, in Table 3, $\lambda_{OFF. n}$ is the longest wavelength where the optical filter exhibits a transmittance of 50% in a wavelength region of 700 nm to 2,000 nm and an incident angle of 0°, and n is the number of the incident angle. In addition, in Table 3, the bandwidth is the difference between $\lambda_{ON. n}$ and $\lambda_{OFF. n}$, and the central wavelength means the wavelength obtained by dividing the sum of $\lambda_{ON. n}$ and $\lambda_{OFF. n}$ by 2.

2. Embodiment 2

A reflective layer was formed by alternately repeatedly stacking an amorphous silicon layer and an $SiO_2$ layer on one surface of the same glass substrate as used in Embodiment 1. In this process, except that the thickness of the amorphous silicon layer and the $SiO_2$ layer in the reflective layer was controlled as shown in Table 4 below, the formation method, the refractive index, and the extinction coefficient K of each layer were the same as in Embodiment 1. In Table 4, a-Si means an amorphous silicon layer, the layer number 1 is the first layer formed on the glass substrate, and the layer number 35 is the last layer formed.

TABLE 4

| Layer Number | Material | Thickness (nm) |
|---|---|---|
| 1 | a-Si | 124.26 |
| 2 | $SiO_2$ | 136.63 |
| 3 | a-Si | 110.06 |
| 4 | $SiO_2$ | 52.45 |
| 5 | a-Si | 135.46 |
| 6 | $SiO_2$ | 102.05 |
| 7 | a-Si | 94.75 |
| 8 | $SiO_2$ | 100.56 |
| 9 | a-Si | 136.90 |
| 10 | $SiO_2$ | 117.79 |
| 11 | a-Si | 81.85 |
| 12 | $SiO_2$ | 54.64 |

TABLE 4-continued

| Layer Number | Material | Thickness (nm) |
|---|---|---|
| 13 | a-Si | 130.75 |
| 14 | SiO$_2$ | 175.39 |
| 15 | a-Si | 87.93 |
| 16 | SiO$_2$ | 121.77 |
| 17 | a-Si | 131.29 |
| 18 | SiO$_2$ | 174.36 |
| 19 | a-Si | 83.03 |
| 20 | SiO$_2$ | 60.21 |
| 21 | a-Si | 41.59 |
| 22 | SiO$_2$ | 130.27 |
| 23 | a-Si | 124.93 |
| 24 | SiO$_2$ | 133.09 |
| 25 | a-Si | 126.56 |
| 26 | SiO$_2$ | 172.87 |
| 27 | a-Si | 48.57 |
| 28 | SiO$_2$ | 160.61 |
| 29 | a-Si | 134.58 |
| 30 | SiO$_2$ | 109.15 |
| 31 | a-Si | 118.96 |
| 32 | SiO$_2$ | 195.95 |
| 33 | a-Si | 132.95 |
| 34 | SiO$_2$ | 196.84 |
| 35 | a-Si | 135.49 |

Figure 4:
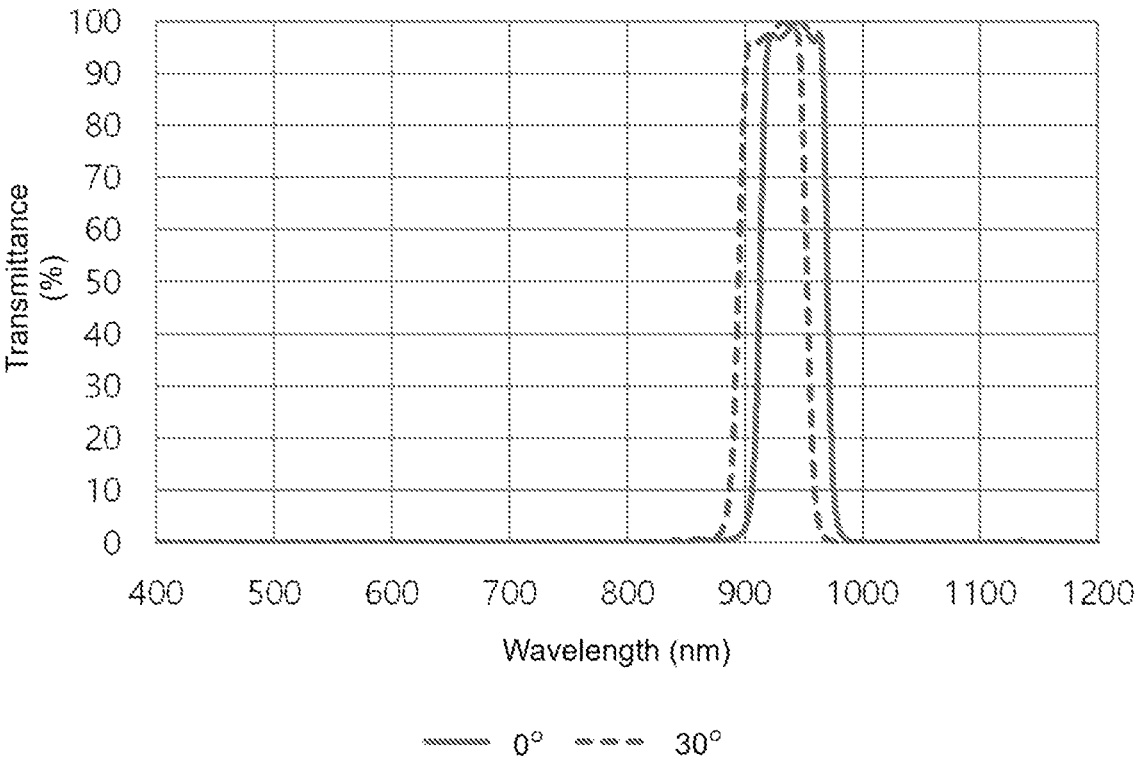
FIG. 4 shows the transmittance spectrum of an optical filter according to Embodiment 2 (0° and 30° mean incident angles of incident light).

FIG. 4 is a transmittance spectrum for the optical filter formed in the above manner. The transmittance characteristics of the optical filter are shown in Table 5 below.

TABLE 5

| Optical Properties | Incident Angle of 0° | Incident Angle of 30° |
|---|---|---|
| Central Wavelength (nm) | 942.05 | 924.35 |
| Transmittance at Central Wavelength (%) | 99.54 | 98.34 |
| Average Transmittance within Transmittance Band (%) | 93.98 | 91.85 |
| Average Transmittance outside Transmittance Band (%) | 0.58 | 0.58 |
| $\lambda_1$ (unit: nm) | 903.2 | 884.2 |
| $\lambda_2$ (unit: nm) | 922.2 | 903.7 |
| $\lambda_3$ (unit: nm) | 977.2 | 961.1 |
| $\lambda_4$ (unit: nm) | 964.7 | 947.7 |
| $\lambda_{ON.\ n}$ (unit: nm) | 914.0 | 895.3 |
| $\lambda_{OFF.\ n}$ (unit: nm) | 970.1 | 953.4 |
| Bandwidth (unit: nm) | 56.0 | 58.1 |

In Table 5, $\lambda_1$ is the shortest wavelength where the optical filter exhibits a transmittance of 10% in a wavelength region of 700 nm to 2,000 nm, and $\lambda_2$ is the shortest wavelength where the optical filter exhibits a transmittance of 80% in a wavelength region of 700 nm to 2,000 nm. In addition, in Table 5, $\lambda_3$ is the longest wavelength where the optical filter exhibits a transmittance of 10% in a wavelength region of 700 nm to 2,000 nm, and $\lambda_4$ is the longest wavelength where the optical filter exhibits a transmittance of 80% in a wavelength region of 700 nm to 2,000 nm. In addition, in Table 5, $\lambda_{ON.\ n}$ is the shortest wavelength where the optical filter exhibits a transmittance of 50% in a wavelength region of 700 nm to 2,000 nm and an incident angle of 0°, and n is the number of the incident angle. In addition, in Table 5, $\lambda_{OFF.\ n}$ is the longest wavelength where the optical filter exhibits a transmittance of 50% in a wavelength region of 700 nm to 2,000 nm and an incident angle of 0°, and n is the number of the incident angle. In addition, in Table 5, the bandwidth is the difference between $\lambda_{ON.\ n}$ and $\lambda_{OFF.\ n}$, and the central wavelength refers to a wavelength obtained by dividing the sum of $\lambda_{ON.\ n}$ and $\lambda_{OFF.\ n}$ by 2.

3. Embodiment 3

A reflective layer was formed by alternately repeatedly stacking an amorphous silicon layer and an SiO$_2$ layer on one surface of the same glass substrate as used in Embodiment 1. In this process, except that the thickness of the amorphous silicon layer and the SiO$_2$ layer in the reflective layer was controlled as shown in Table 6 below, the formation method, the refractive index, and the extinction coefficient K of each layer were the same as in Embodiment 1. In Table 6, a-Si means the amorphous silicon layer, the layer number 1 is the first layer formed on the glass substrate, and the layer number 30 is the last layer formed.

TABLE 6

| Layer Number | Material | Thickness (nm) |
|---|---|---|
| 1 | SiO$_2$ | 45 |
| 2 | a-Si | 401.76 |
| 3 | SiO$_2$ | 238.54 |
| 4 | a-Si | 217.77 |
| 5 | SiO$_2$ | 193.58 |
| 6 | a-Si | 184.28 |
| 7 | SiO$_2$ | 155.49 |
| 8 | a-Si | 389.16 |
| 9 | SiO$_2$ | 175.29 |
| 10 | a-Si | 209.27 |
| 11 | SiO$_2$ | 260.63 |
| 12 | a-Si | 183.27 |
| 13 | SiO$_2$ | 349.25 |
| 14 | a-Si | 125.09 |
| 15 | SiO$_2$ | 147.05 |
| 16 | a-Si | 175.8 |
| 17 | SiO$_2$ | 430 |
| 18 | a-Si | 205 |
| 19 | SiO$_2$ | 219.71 |
| 20 | a-Si | 48.37 |
| 21 | SiO$_2$ | 325.36 |
| 22 | a-Si | 59.92 |
| 23 | SiO$_2$ | 177.17 |
| 24 | a-Si | 67.88 |
| 25 | SiO$_2$ | 728.29 |
| 26 | a-Si | 103.58 |
| 27 | SiO$_2$ | 181.19 |
| 28 | a-Si | 65.39 |
| 29 | SiO$_2$ | 148.28 |
| 30 | a-Si | 58.93 |

Figure 5:
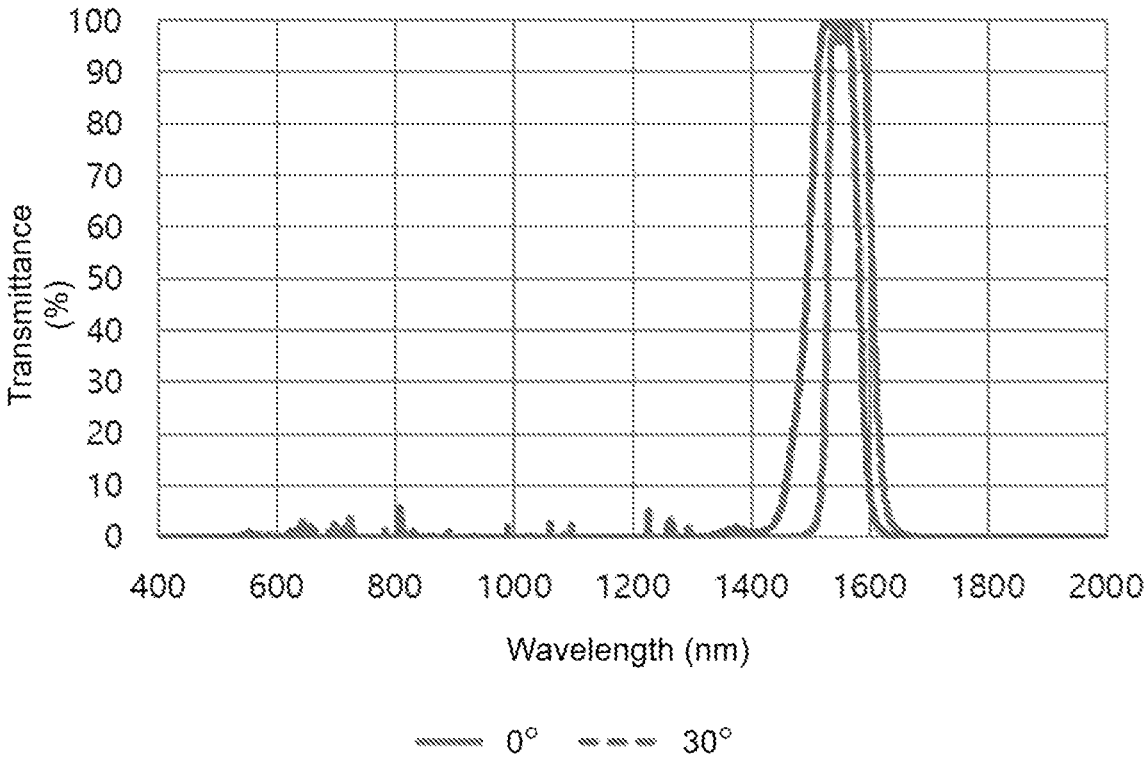
FIG. 5 shows the transmittance spectrum of an optical filter according to Embodiment 3 (0° and 30° mean incident angles of incident light).

FIG. 5 is a transmittance spectrum for the optical filter formed in the above manner. The transmittance characteristics of the optical filter are shown in Table 7 below.

TABLE 7

| Optical Properties | Incident Angle of 0° | Incident Angle of 30° |
|---|---|---|
| Central Wavelength (nm) | 1,566.4 | 1535.1 |
| Transmittance at Central Wavelength (%) | 99.99 | 99.81 |
| Average Transmittance within Transmittance Band (%) | 88.30 | 85.49 |
| Average Transmittance outside Transmittance Band (%) | 0.54 | 1.07 |
| $\lambda_1$ (unit: nm) | 1,515.5 | 1,457.6 |
| $\lambda_2$ (unit: nm) | 1,533.2 | 1,510.2 |
| $\lambda_3$ (unit: nm) | 1,626.0 | 1,600.5 |
| $\lambda_4$ (unit: nm) | 1,593.0 | 1,569.2 |
| $\lambda_{ON.\ n}$ (unit: nm) | 1,525.6 | 1,487.6 |
| $\lambda_{OFF.\ n}$ (unit: nm) | 1,607.2 | 1,582.6 |
| Bandwidth (unit: nm) | 81.6 | 95 |

In Table 7, $\lambda_1$ is the shortest wavelength where the optical filter exhibits a transmittance of 10% in a wavelength region of 700 nm to 2,000 nm, and $\lambda_2$ is the shortest wavelength where the optical filter exhibits a transmittance of 80% in a wavelength region of 700 nm to 2,000 nm. In addition, in Table 7, $\lambda_3$ is the longest wavelength where the optical filter exhibits a transmittance of 10% in a wavelength region of 700 nm to 2,000 nm, and $\lambda_4$ is the longest wavelength where the optical filter exhibits a transmittance of 80% in a wavelength region of 700 nm to 2,000 nm. In addition, in Table 7, $\lambda_{ON. n}$ is the shortest wavelength where the optical filter exhibits a transmittance of 50% in a wavelength region of 700 nm to 2,000 nm and an incident angle of 0°, and n is the number of the incident angle. In addition, in Table 7, $\lambda_{OFF. n}$ is the longest wavelength where the optical filter exhibits a transmittance of 50% in a wavelength region of 700 nm to 2,000 nm and an incident angle of 0°, and n is the number of the incident angle. In addition, in Table 7, the bandwidth is the difference between $\lambda_{ON. n}$ and $\lambda_{OFF. n}$, and the central wavelength refers to a wavelength obtained by dividing the sum of $\lambda_{ON. n}$ and $\lambda_{OFF. n}$ by 2.

4. Comparative Example 1

An optical filter was prepared in the same manner as in Embodiment 1, except that the deposition temperature condition was changed to room temperature when an amorphous silicon layer and a $SiO_2$ layer were formed.

Table 8 below shows the refractive index with respect to each thickness and the wavelength exhibiting the extinction coefficient K of zero for the amorphous silicon layer formed in the above manner. The refractive indices measured in Table 8 below are for light with wavelengths of 940 nm and 1,550 nm. On the other hand, the formed $SiO_2$ layer exhibited a refractive index of about 1.46 at a thickness of 160 nm. Because there is almost no difference in refractive index due to the thickness difference, the refractive index of all $SiO_2$ layers is about 1.46.

TABLE 8

| Thickness (nm) | Refractive Index (1,550 nm) | Wavelength for Extinction Coefficient K of Zero (nm) |
| --- | --- | --- |
| 107.20 | 2.86336 | 860 |
| 180.73 | 2.69943 | N/A |
| 180.95 | 2.69191 | N/A |

Figure 6:
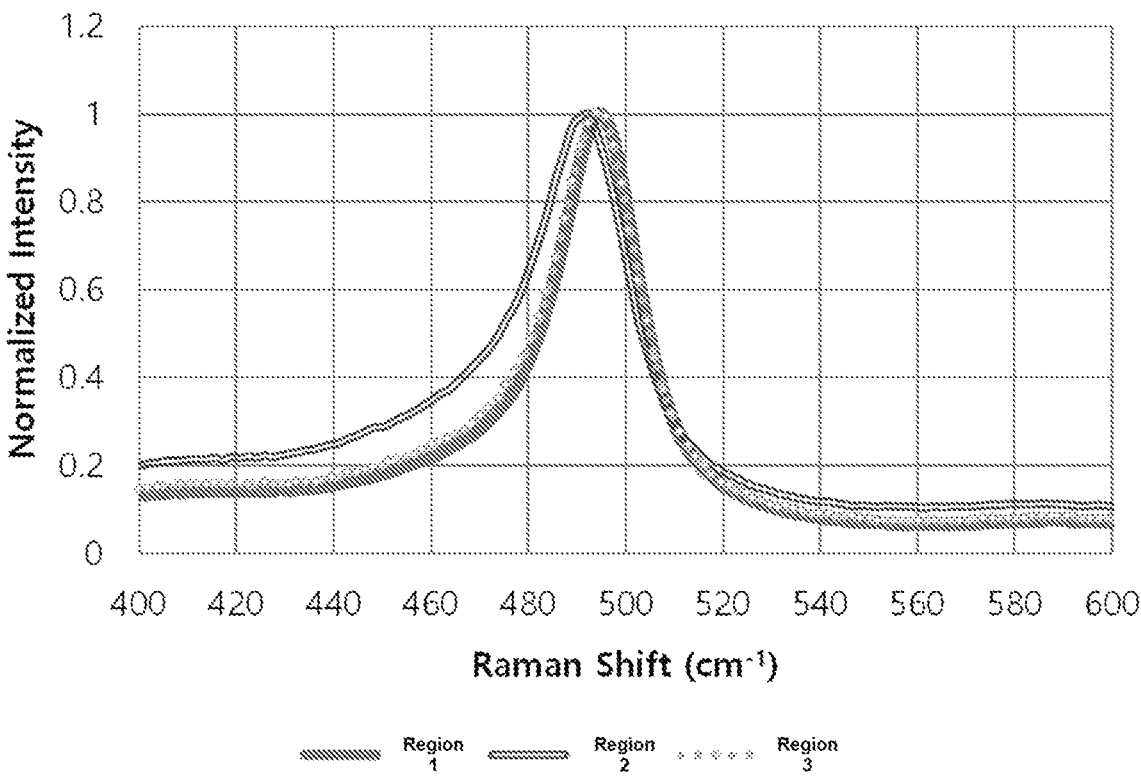
FIG. 6 shows a Raman spectrum of an amorphous silicon layer having a thickness of about 180 nm and a refractive index of about 2.69943 with respect to light having a wavelength of 1,550 nm in Comparative Example 1.

In addition, FIG. 6 is a Raman spectrum of an amorphous silicon layer having a thickness of about 180 nm formed by the same manner above and a refractive index of about 2.69943 for light of a wavelength of 1,550 nm. The Raman peak obtained from the spectrum can be seen at about 493.5693 $cm^{-1}$ (Region 1: 494.136 $cm^{-1}$, Region 2: 494.136 $cm^{-1}$ and Region 3: 492.436 $cm^{-1}$).

Figure 7:
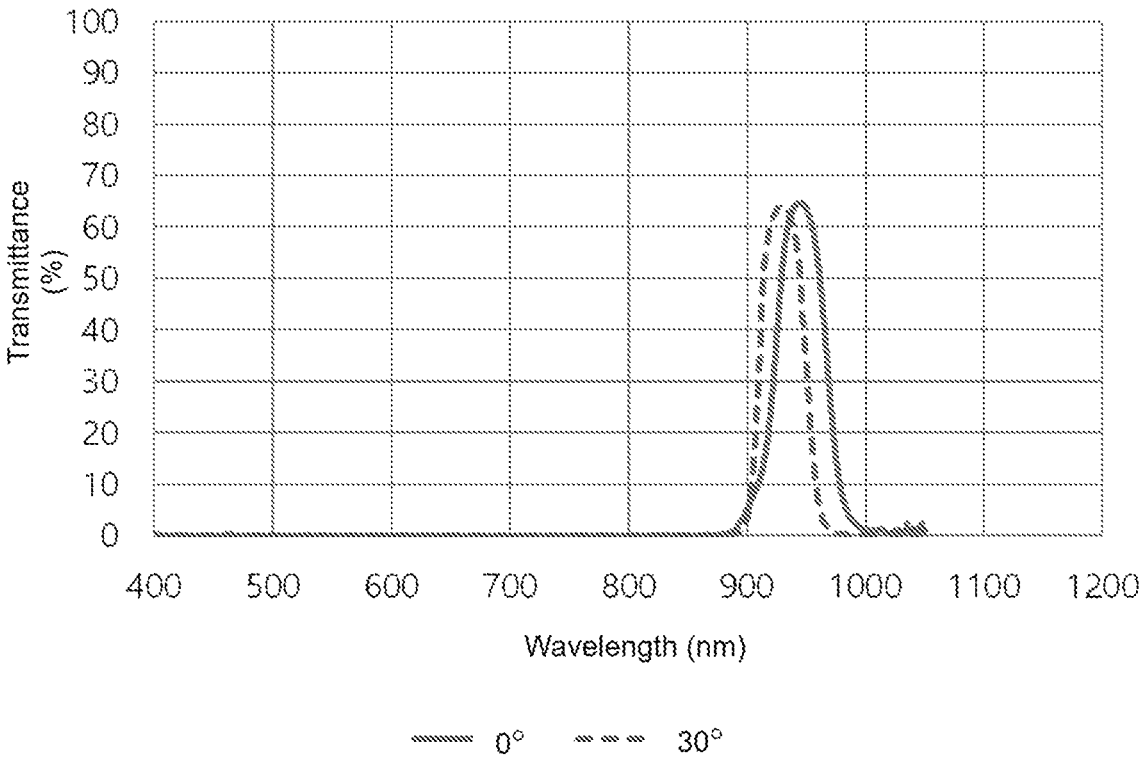
FIG. 7 shows a transmittance spectrum of an optical filter according to Comparative Example 1 (0° and 30° mean incident angles of incident light).

FIG. 7 is a transmittance spectrum of the optical filter formed in the above manner. The transmittance characteristics of the optical filter are shown in Table 9 below.

TABLE 9

| Optical Properties | Incident Angle of 0° | Incident Angle of 30° |
| --- | --- | --- |
| Central Wavelength (nm) | 945.35 | 930.15 |
| Transmittance at Central Wavelength (%) | 64.66 | 64.08 |
| Average Transmittance within Transmittance Band (%) | 61.24 | 61.38 |
| Average Transmittance outside Transmittance Band (%) | 2.18 | 1.61 |
| $\lambda_1$ (unit: nm) | 906.0 | 902.4 |

TABLE 9-continued

| Optical Properties | Incident Angle of 0° | Incident Angle of 30° |
| --- | --- | --- |
| $\lambda_2$ (unit: nm) | 949.6 | 927.8 |
| $\lambda_3$ (unit: nm) | 981.2 | 959.8 |
| $\lambda_4$ (unit: nm) | 943.7 | 931.1 |
| $\lambda_{ON. n}$ (unit: nm) | 930.9 | 916.9 |
| $\lambda_{OFF. n}$ (unit: nm) | 959.8 | 943.4 |
| Bandwidth (unit: nm) | 28.9 | 26.5 |

In Table 9, $\lambda_1$ is the shortest wavelength where the optical filter exhibits a transmittance of 10% in a wavelength region of 700 nm to 2,000 nm, and $\lambda_2$ is the shortest wavelength where the optical filter exhibits a transmittance of 80% in a wavelength region of 700 nm to 2,000 nm. In addition, in Table 9, $\lambda_3$ is the longest wavelength where the optical filter exhibits transmittance of 10% in a wavelength region of 700 nm to 2,000 nm, and $\lambda_4$ is the longest wavelength where the optical filter exhibits a transmittance of 80% in a wavelength region of 700 nm to 2,000 nm. In addition, in Table 9, $\lambda_{ON. n}$ is the shortest wavelength where the optical filter exhibits a transmittance of 50% in a wavelength region of 700 nm to 2,000 nm and an incident angle of 0°, and n is the number of the incident angle. In addition, in Table 9, $\lambda_{OFF. n}$ is the longest wavelength where the optical filter exhibits a transmittance of 50% in a wavelength region of 700 nm to 2,000 nm and an incident angle of 0°, and n is the number of the incident angle. In addition, in Table 9, the bandwidth is the difference between $\lambda_{ON. n}$ and $\lambda_{OFF. n}$, and the central wavelength refers to a wavelength obtained by dividing the sum of $\lambda_{ON. n}$ and $\lambda_{OFF. n}$ by 2.

The illustrated and above-describe embodiments for the optical filter and a LiDAR system including the optical film are not intended to be limiting in any way, and any such modifications to the embodiments described are intended to be included within the spirit and scope of the present invention and protected by the claims that follow.

What is claimed is:

1. An optical filter comprising:
a reflective layer including a first layer and a second layer, formed in the reflective layer, respectively,
wherein the first layer is an amorphous silicon layer having a measured Raman peak of 495 $cm^{-1}$ or more and 500 $cm^{-1}$ or less, and the second layer has a lower refractive index than a refractive index of the amorphous silicon layer, and
wherein the optical filter shows a transmission band having a bandwidth within a range of 20 nm to 150 nm within a wavelength range of 700 nm to 2,000 nm and has an average transmittance of 5% or less in a wavelength band other than the wavelength forming the transmission band within a wavelength range of 700 nm to 2,000 nm.

2. The optical filter of claim 1, wherein a central wavelength of the transmission band is in a range of 800 nm to 1,650 nm.

3. The optical filter of claim 2, wherein a highest transmittance within the transmittance band is 90% or more.

4. The optical filter of claim 1, wherein an absolute value of $L_1$ in the following Equation 1 is 0.6 or less, and an absolute value of $L_2$ in the following Equation 2 is 0.6 or less:

$$L_1 = 0.01 \times (\lambda_1 - \lambda_2); \text{ and} \qquad \text{[Equation 1]}$$

[Equation 2]

$L_2=0.01\times(\lambda_3-\lambda_4)$, wherein in Equation 1, $\lambda_1$ is a shortest wavelength of the optical filter exhibiting a transmittance of 10% in a wavelength region of 700 nm to 2,000 nm, and $\lambda_2$ is a shortest wavelength of the optical filter exhibiting a transmittance of 80% in the wavelength region of 700 nm to 2,000 nm; and in Equation 2, $\lambda_3$ is a longest wavelength of the optical filter exhibiting a transmittance of 10% in the wavelength region of 700 nm to 2,000 nm, and $\lambda_4$ is a longest wavelength of the optical filter exhibiting a transmittance of 80% in the wavelength region of 700 nm to 2,000 nm.

5. The optical filter of claim 1, wherein an absolute value of AXON in the following Equation 3 is 5% or less:

[Equation 3]

$\Delta\lambda_{ON}=100\times(\lambda_{ON.\,30}-\lambda_{ON.\,0})/\lambda_{ON.\,0}$, where in Equation 3, $\lambda_{ON.\,0}$ is the shortest wavelength of the optical filter exhibiting a transmittance of 50% in a wavelength region of 700 nm to 2,000 nm and an incident angle of 0°, and $\lambda_{ON.\,30}$ is the shortest wavelength of the optical filter exhibiting a transmittance of 50% in the wavelength region of 700 nm to 2,000 nm and an incident angle of 30°.

6. The optical filter of claim 1, wherein an absolute value of $\Delta\lambda_{OFF}$ of the following Equation 4 is 5% or less:

[Equation 4]

$\Delta\lambda_{OFF}=100\times(\lambda_{OFF.\,30}-\lambda_{OFF.\,0})/\lambda_{OFF.\,0}$, where in Equation 4, $\lambda_{OFF.\,0}$ is the longest wavelength of the optical filter exhibiting a transmittance of 50% in a wavelength region of 700 nm to 2,000 nm and an incident angle of 0°, and $\lambda_{OFF.\,30}$ is the longest wavelength of the optical filter exhibiting a transmittance of 50% in the wavelength region of 700 nm to 2,000 nm and an incident angle of 30°.

7. The optical filter of claim 1, wherein the absolute value of $\Delta\lambda_C$ of the following Equation 5 is 5% or less:

[Equation 5]

$\Delta\lambda_C=100\times(\lambda_{C.\,30}-_{C.\,0})/\lambda_{C.\,0}$ where in Equation 5, $\lambda_{C.\,0}$ is a central wavelength of the transmission band of the optical filter at an incident angle of 0°, and $\lambda_{C.\,30}$ is a central wavelength of the transmission band of the optical filter at an incidence angle of 30°.

8. The optical filter of claim 1, wherein an absolute value of AB in the following Equation 6 is 30% or less:

[Equation 6]

$\Delta B=100\times(B_{30}-B_0)/B_0$, where in Equation 6, $B_0$ is a bandwidth of the transmission band of the optical filter at an incident angle of 0° and $B_{30}$ is a bandwidth of the transmission band of the optical filter at an incidence angle of 30°.

9. The optical filter of claim 1, wherein the absolute value of $\Delta L_1$ in the following Equation 7 is 3 or less, and an absolute value of $\Delta L_2$ in the following Equation 8 is 3 or less:

$\Delta L_1=(L_{1.30}-L_{1.0})/L_{1.0}$; and     [Equation 7]

[Equation 8]

$\Delta L_2=(L_{2.30}-L_{2.0})/L_{2.0}$, where in Equation 7, $L_{1.30}$ is a value of $L_1$ of Equation 1 obtained at an incident angle of 30°, $L_{1.0}$ is a value of $L_1$ of Equation 1 obtained at an incident angle of 0° and $L_{2.30}$ in Equation 8 is a value of $L_2$ of Equation 2 obtained at an incident angle of 30°, $L_{2.0}$ is a value of $L_2$ of Equation 2 obtained at an incident angle of 0°:

$L_1=0.01\times(\lambda_1-\lambda_2)$; and     [Equation 1]

[Equation 2]

$L_2=0.01\times(\lambda_3-\lambda_4)$, where in Equation 1, $\lambda_1$ is a shortest wavelength of the optical filter exhibiting a transmittance of 10% in a wavelength region of 700 nm to 2,000 nm, and $\lambda_2$ is a shortest wavelength of the optical filter exhibiting a transmittance of 80% in the wavelength region of 700 nm to 2,000 nm; and in Equation 2, $\lambda_3$ is a longest wavelength of the optical filter exhibiting a transmittance of 10% in the wavelength region of 700 nm to 2,000 nm, and $\lambda_4$ is a longest wavelength of the optical filter exhibiting a transmittance of 80% in the wavelength region of 700 nm to 2,000 nm.

10. The optical filter of claim 1, wherein the first layer has a refractive index of 3.3 or more at a wavelength of 940 nm and a refractive index of 3.1 or more at a wavelength of 1550 nm.

11. The optical filter of claim 1, wherein the first layer has an extinction coefficient K of zero at any one of a thickness within a thickness range of 60 nm to 300 nm and a wavelength within a wavelength range of 800 nm to 900 nm.

12. The optical filter according to claim 10, wherein a ratio $n_1/n_2$ of the refractive index $n_1$ of the first layer and a refractive index $n_2$ of the second layer is 1.3 or more.

13. The optical filter of claim 1, wherein the first layer and the second layer are alternately stacked on each other in the reflective layer, and the reflective layer further includes a third layer, and a ratio $n_1/n_3$ of the refractive index $n_1$ of the first layer and a refractive index $n_3$ of the third layer is 1.3 or more.

14. The optical filter of claim 1, wherein R in the following Equation 9 is in a range of 14 to 20:

[Equation 9]

$R=4\times T/\lambda_C$, wherein in Equation 9, T is a thickness of the reflective layer having a unit in mm and $\lambda_C$ is a central wavelength of the transmission band of the optical filter.

15. The optical filter of claim 1, wherein an average thickness of the first and second layers in the reflective layer is each independently within a range of 80 nm to 400 nm.

16. The optical filter of claim 1, wherein $R_H$ of the following Equation 10 is 30% or more:

[Equation 10]

$R_H=100\times T_H/(T_H+T_L)$, wherein in Equation 10, $T_H$ is a total thickness of the first layer in the reflective layer, and $T_L$ is a total thickness of the second layer in the reflective layer.

17. The optical filter of claim 1, wherein $R_{HO}$ of the following Equation 11 is in a range of 55 to 80:

[Equation 11]

$R_{HO}=T_{HO}/(T_{HO}+T_{LO})$, wherein $T_{HO}$ is an optical thickness of the first layer in the reflective layer, $T_{LO}$ is an optical thickness of the second layer in the reflective layer, and the optical thickness of the first layer is a product of a total thickness of the first layer in the reflective layer and the refractive index of the first layer, and the optical thickness of the second layer is a product of a total thickness of the second layer in the reflective layer and the refractive index of the second layer.

18. The optical filter of claim 1, wherein a total number of layers of the first and the second layers in the reflective layer is in a range of 20 to 150 layers, and a ratio $(L_{1+2}/L_T)$ between the total number of the layers of the first and second layers $(L_{1+2})$ in the reflective layer and a number of layers of entire sub-layers $(L_T)$ is in a range of 0.85 to 1.

19. The optical filter of claim 18, wherein a ratio $(T_1/T_2)$ between a total number of layers of the first layer $(T_1)$ and a total number of layers of the second layer ($T_2$) in the reflective layer is in a range of 0.5 to 1.5.

20. A LiDAR system comprising the optical filter of claim 1.

* * * * *